United States Patent
Chen et al.

(10) Patent No.: US 11,581,612 B2
(45) Date of Patent: *Feb. 14, 2023

(54) ELECTROLYTE SEPARATORS INCLUDING LITHIUM BOROHYDRIDE AND COMPOSITE ELECTROLYTE SEPARATORS OF LITHIUM-STUFFED GARNET AND LITHIUM BOROHYDRIDE

(71) Applicant: QUANTUMSCAPE BATTERY, INC., San Jose, CA (US)

(72) Inventors: Zhebo Chen, San Jose, CA (US); Tim Holme, Mountain View, CA (US); Marie Mayer, Sunnyvale, CA (US); Nick Perkins, San Jose, CA (US); Eric Tulsky, San Jose, CA (US); Cheng-Chieh Chao, San Jose, CA (US); Christopher Dekmezian, Campbell, CA (US); Shuang Li, Sunnyvale, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 17/229,680

(22) Filed: Apr. 13, 2021

(65) Prior Publication Data

US 2021/0234230 A1      Jul. 29, 2021

Related U.S. Application Data

(63) Continuation of application No. 16/343,365, filed as application No. PCT/US2017/057735 on Oct. 20, 2017, now Pat. No. 11,011,796.

(Continued)

(51) Int. Cl.
*H01M 50/431*   (2021.01)
*H01M 4/505*    (2010.01)
(Continued)

(52) U.S. Cl.
CPC ........ *H01M 50/431* (2021.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| | | |
|---|---|---|
| 4,201,760 A | 5/1980 | Arendt et al. |
| 4,307,163 A | 12/1981 | Joshi et al. |

(Continued)

FOREIGN PATENT DOCUMENTS

| | | |
|---|---|---|
| EP | 0 103 505 A1 | 3/1984 |
| EP | 3 239 986 A1 | 11/2017 |

(Continued)

OTHER PUBLICATIONS

International Search Report and Written Opinion for PCT/US2017/057735 dated Dec. 14, 2017; 11 pages.

(Continued)

*Primary Examiner* — Wyatt P McConnell
(74) *Attorney, Agent, or Firm* — Squire Patton Boggs (US) LLP

(57) ABSTRACT

Set forth herein are compositions comprising $A \cdot (LiBH_4) \cdot B \cdot (LiX) \cdot C \cdot (LiNH_2)$, wherein X is fluorine, bromine, chloride, iodine, or a combination thereof, and wherein $0.1 \leq A \leq 3$, $0.1 \leq B \leq 4$, and $0 \leq C \leq 9$ that are suitable for use as solid electrolyte separators in lithium electrochemical devices. Also set forth herein are methods of making $A \cdot (LiBH_4) \cdot B \cdot (LiX) \cdot C \cdot (LiNH_2)$ compositions. Also disclosed herein are electrochemical devices which incorporate $A \cdot (LiBH_4) \cdot B \cdot (LiX) \cdot C \cdot (LiNH_2)$ compositions and other materials.

20 Claims, 19 Drawing Sheets

Related U.S. Application Data

(60) Provisional application No. 62/411,464, filed on Oct. 21, 2016.

(51) Int. Cl.
  H01M 4/525 (2010.01)
  H01M 10/0525 (2010.01)
  H01M 10/0562 (2010.01)
(52) U.S. Cl.
  CPC ............... H01M 10/0525 (2013.01); H01M 10/0562 (2013.01); H01M 2300/0068 (2013.01); H01M 2300/0094 (2013.01)

(56) References Cited

U.S. PATENT DOCUMENTS

| | | |
|---|---|---|
| 4,327,119 A | 4/1982 | Lis et al. |
| 4,833,050 A | 5/1989 | Whitney et al. |
| 5,180,686 A | 1/1993 | Banerjee et al. |
| 5,421,895 A | 6/1995 | Tsubouchi et al. |
| 5,431,315 A | 7/1995 | Chun et al. |
| 5,545,394 A | 8/1996 | Doxsee |
| 5,589,296 A | 12/1996 | Iwamoto et al. |
| 5,595,606 A | 1/1997 | Fujikawa et al. |
| 6,025,094 A | 2/2000 | Visco et al. |
| 6,485,622 B1 | 11/2002 | Fu |
| 6,511,516 B1 | 1/2003 | Johnson et al. |
| 6,537,845 B1 | 3/2003 | McCandless et al. |
| 6,641,863 B2 | 11/2003 | Kugai et al. |
| 6,709,563 B2 | 3/2004 | Nagai et al. |
| 6,794,288 B1 | 9/2004 | Kolics et al. |
| 6,821,910 B2 | 11/2004 | Adomaitis et al. |
| 7,211,532 B2 | 5/2007 | Fu |
| 7,235,483 B2 | 6/2007 | Ivanov |
| 7,700,161 B2 | 4/2010 | Oladeji et al. |
| 7,793,611 B2 | 9/2010 | Oladeji |
| 7,972,899 B2 | 7/2011 | Oladeji et al. |
| 8,114,171 B2 | 2/2012 | Visco et al. |
| 8,225,744 B2 | 7/2012 | Oladeji et al. |
| 8,349,498 B2 | 1/2013 | Oladeji et al. |
| 8,372,163 B2 | 2/2013 | Oladeji et al. |
| 8,414,971 B2 | 4/2013 | Oladeji et al. |
| 10,008,736 B2 | 6/2018 | Chao et al. |
| 11,011,796 B2 | 5/2021 | Chao et al. |
| 2002/0108565 A1 | 8/2002 | Rose |
| 2002/0170386 A1 | 11/2002 | Bond et al. |
| 2003/0018939 A1 | 1/2003 | Kinoshita et al. |
| 2003/0181040 A1 | 9/2003 | Ivanov et al. |
| 2004/0084143 A1 | 5/2004 | Ivanov et al. |
| 2005/0124158 A1 | 6/2005 | Lopatin et al. |
| 2006/0063051 A1 | 3/2006 | Jang |
| 2007/0003833 A1 | 1/2007 | Li et al. |
| 2007/0087269 A1 | 4/2007 | Inda |
| 2007/0148553 A1 | 6/2007 | Weppner et al. |
| 2007/0160911 A1 | 7/2007 | Senga et al. |
| 2007/0172739 A1 | 7/2007 | Visco et al. |
| 2008/0299703 A1 | 12/2008 | Oladeji |
| 2009/0011339 A1 | 1/2009 | Seino et al. |
| 2009/0202905 A1 | 8/2009 | Morita et al. |
| 2010/0032008 A1 | 2/2010 | Adekore |
| 2010/0266899 A1 | 10/2010 | Barker et al. |
| 2011/0008680 A1 | 1/2011 | Muldoon et al. |
| 2011/0027940 A1 | 2/2011 | Oladeji |
| 2011/0171398 A1 | 7/2011 | Oladeji |
| 2011/0171528 A1 | 7/2011 | Oladeji |
| 2013/0202971 A1 | 8/2013 | Zhao et al. |
| 2014/0113187 A1 | 4/2014 | Winoto et al. |
| 2015/0099190 A1 | 4/2015 | Holme et al. |
| 2016/0204466 A1* | 7/2016 | Nogami ............... H01M 4/604 429/223 |
| 2017/0005367 A1* | 1/2017 | Van Berkel ....... H01M 10/0565 |
| 2017/0162901 A1* | 6/2017 | Chen ................. H01M 10/0525 |
| 2019/0319240 A1 | 10/2019 | Chen et al. |

FOREIGN PATENT DOCUMENTS

| | | |
|---|---|---|
| FR | 2 873 856 A1 | 2/2006 |
| JP | H05306119 A | 11/1993 |
| WO | WO 97/21848 A1 | 6/1997 |
| WO | WO 98/58745 A1 | 12/1998 |
| WO | WO 2009/041774 A2 | 4/2009 |
| WO | WO 2012/112229 A2 | 8/2012 |
| WO | WO 2016/103894 | 6/2016 |
| WO | WO 2016/210371 | 12/2016 |
| WO | WO 2017/096088 | 6/2017 |
| WO | WO 2019/078897 | 4/2019 |

OTHER PUBLICATIONS

International Search Report and Written Opinion of PCT/US2011/000594 dated Aug. 30, 2011; 8 pages.

International Search Report and Written Opinion of PCT/US2017/057739 dated Mar. 8, 2018; 18 pages.

International Search Report and Written Opinion of PCT/US2014/024162 dated Jul. 9, 2014; 9 pages.

Aksay, "Structural and morphological properties of $CuInS_2$ polycrystalline films obtained by spray pyrolysis method", J. Arts and Sci. 4:1-9, 2005.

Andersen et al., "Neutron Scattering Studies of the Ionic Conductor LiI $D_2O$", Physica Scripta. vol. 25, 1982, pp. 780-784.

Barlage et al., "$Li_2I(OH)$: Eine Verbindung mit eindimensional unendlich kantenverknupften $[Li_{frac{4}{2}}(OH)]^+$—Pyramiden", Z. anorg. allg. Chem. 620, 1994, pp. 475-478.

Chen et al., "Electrode and solid electrolyte thin films for secondary lithium-ion batteries", Journal of Power Sources, vol. 68, No. 2, Oct. 1, 1997, pp. 377-380.

Chen et al., "Electrostatic spray deposition of thin layers of cathode materials for lithium battery", Solid State Ionics, Diffusion & Reactions, vol. 86-88, Jul. 1996, pp. 1301-1306.

Cho et al., "Effect of $P_2O_5$ in $Li_2O$-$P_2O_5$-$B_2O_3$ electrolyte fabricated by aerosol flame deposition", Journal of Power Sources, vol. 183, No. 1, Aug. 15, 2008, pp. 431-435.

Eilbracht et al., Orientational disorder in perovskite like structures of $Li_2X(OD)$ (X=Cl, Br) and LiBr $D_2O$, Physica B, 234-236, 1997, pp. 48-50.

Emly et al., "Phase Stability and Transport Mechanisms in Antiperovskite $Li_3OCI$ and $Li_3OBr$ Superionic Conductors." Chem. Mater. 2013, 25, pp. 4663-4670, available Nov. 2013.

Guo et al., "Fabrication and Optoelectronic Properties of a Transparent ZnO Homostructural Light Emitting Diode", Japanese Journal of Applied Physics, Mar. 2001, vol. 40, part 2, No. 3A, pp. L177-L180.

Hartwig et al., "Ionic Conductivities of Lithium-Halide-Based Quaternary Compounds", Solid State Ionics ¾, 1981, pp. 249-254.

Hartwig et al., "Lithium Hydroxide Halides: Phase Equilibria and Ionic Conductivities", Journal of the Less-Common Metals, vol. 78, 1981, pp. 227-233.

Hayashi et al., "Crystallisation of $Li_2S$-$SiS_2$ based lithium ion conducting glasses", Physics and Chemistry of Glasses, Society of Glass Technology, Sheffield, UK, Dec. 1999, vol. 40, No. 6, pp. 333-338.

Hepp et al., "Aerosol-assisted chemical vapor deposited thin films for space photovoltaics", American Institute of Aeronautics and Astronautics, 4th International Energy Conversion Engineering Conference and Exhibit (IECEC) Jun. 26-29, 2006, San Diego, California; 15 pages.

Hunger et al., "Control of optical and electrical properties of ZnO films for photovoltaic applications", Mat. Res. Soc. Symp. Proc. 668, 2001, H2.8.1-H2.8.6.

Ishizaki et al., "Electrochemical Growth of Highly Resistive ZnO Film in an Aqueous solution", Letters, vol. 51, No. 1, pp. 151-152.

Ishizaki et al., "Incorporation of Boron in ZnO film from an Aqueous solution containing zinc nitrate and dimethylamine-borane by electrochemical reaction", Thin Solid Films, 2002, vol. 411, pp. 65-68.

Ito et al., "Preparation of ZnO thin films using the flowing liquid film method", Thin Solid Films, 1996, vol. 286, pp. 35-36.

(56) References Cited

OTHER PUBLICATIONS

Jaworek et al., "Electrospraying route to nanotechnology: An overview", Journal of Electrostatics, Jan. 28, 2008, vol. 66, No. 3-4, pp. 197-219.
Jimbo et al., "$Cu_2ZnSnS_4$-type thin film solar cells using abundant materials", Thin Solid Films, 2007, vol. 515, pp. 5997-5999.
Ko et al., "Improvement of the quality of ZnO substrates by annealing", Journal of Crystal Growth, vol. 269, 2004, pp. 493-498.
Lu et al., "Defect chemistry and lithium transport in $Li_3OCl$ anti-perovskite superionic conductors", Phys. Chem. Chem. Phys., 2015, 17, pp. 32547-32555.
Ma et al., "Effect of the oxygen partial pressure on the properties of ZnO thin films grown by metalorganic vapor phase epitaxy", Journal of Crystal Growth, 2003, vol. 255, pp. 303-307.
Madarasz et al., "Thermal decomposition of thiourea complexes of Cu(I), Zn(II), and Sn(II) chlorides as precursors for the spray pyrolysis deposition of sulfide thin films", Solid State Ionics, May 1, 2001, vol. 141-142, pp. 439-446.
Manolache et al., "The influence of the precursor concentration on $CuSbS_2$ thin films deposited from aqueous solutions", Thin Solid Films, 2007, vol. 515, pp. 5957-5960.
Matsubara et al., "ZnO transparent conducting films deposited by Pulsed Laser Deposition for Solar Cell applications", Thin Solid Films, vol. 431-432, 2003, pp. 369-372.
Messina et al., "Antimony sulfide thin films in chemically deposited thin film photovoltaic cells", Thin Solid Films, vol. 515, 2007, pp. 5777-5782.
Yeh et al., "Preparation of $Cu_2ZnSnS_4$ thin film by so-gel spin-coated deposition", Advanced Materials Research, vols. 79-82, Jan. 1, 2009, pp. 835-838; Online: Aug. 31, 2009.
Minami et al. "Lithium Ion Conductivity of the $Li_2S-P_2S_5$ glass-based electrolytes prepared by the melt quenching method", Solid State Ionics, vol. 178, 2007, pp. 837-841.
Mosbah et al., "Comparison of the structural and optical properties of zinc oxide thin films deposited by d.c. and r.f. sputtering and spray pyrolysis", Surf. & Coat. Technol., vol. 200, 2005, pp. 293-296.
Murayama et al. "Material design of new lithium ionic conductor, thio-LISICON in the $Li_2S-P_2S_5$ system" Solid State Ionics, 2004, vol. 170, pp. 173-180.
Nakamura et al., "Conductivity Enhancement Of Lithium Bromide Monohydrate By $Al_2O_3$ Particles", Solid State Ionics, vol. 7, 1982, pp. 119-123.
Nanosolar Inc., "High-performance thin-film photovoltaics using low-cost process technology", 17th Intl Photovoltaic Sci. Eng. Conf., Tokyo, Japan, Dec. 3-7, 2007.
Ohshima et al., "Synthesis of p-type ZnO thin films using co-doping techniques based on KrF excimer laser deposition", Thin Solid Films, vol. 435, 2003, pp. 49-55.
Oladeji et al., "A study of the effects of ammonium salts on chemical bath deposited zinc sulfide thin films", Thin Solid Films, vol. 339, 1999, pp. 148-153.
Oladeji et al., "Comparative study of CdS thin films deposited by single, continuous, and multiple dip chemical processes", Thin Solid Films 359, 2000, pp. 154-159.
Oladeji et al., "Optimization of chemical bath deposited CdS thin films", J. Electrochem. Soc., vol. 144, No. 7, Jul. 1997, pp. 2342-2346.
Oladeji et al., "Synthesis and processing of CdS/ZnS multilayer films for solar cell application", Thin Solid Films, vol. 474, 2005, pp. 77-83.
Reckeweg et al., "$Li_5OCl_3$ and $Li_3OCl$: Two Remarkably Different Lithium Oxide Chlorides", Z. Anorg. Allg. Chem. 2012, vol. 638, (12-13), pp. 2081-2086.
Repins et al., "Comparison of device performance and measured transport parameters in widely-varying Cu(In,Ga)(Se,S) solar cells", Prog. Photovolt: Res. Appl., 2006, 14:25-43.
Ryu et al., "Properties of arsenic-doped p-type ZnO grown by hybrid beam deposition", App. Phys. Lett., vol. 83, No. 1, Jul. 7, 2003, pp. 87-89.
Schroeder et al., "Stability of the Solid Electrolyte $Li_3OBr$ to Common Battery Solvents", Materials Research Bulletin, 2014, vol. 49, pp. 614-617.
Schwering et al., "High Lithium Ionic Conductivity in the Lithium Halide Hydrates $Li_{3-n}(OH_n)Cl$ ($0.83 \leq n \leq 2$) and $Li_{3-n}(OH_n)Br$ ($1 \leq n \leq 2$) at Ambient Temperatures", CHEMPHYSCHEM 2003, vol. 4, pp. 343-348.
Shui et al., "Deposition conditions in tailoring the morphology of highly porous reticular films prepared by electrostatic spray deposition (ESD) technique", Applied Surface Science, Dec. 30, 2006, vol. 253, No. 5, pp. 2379-2385.
Studenikin et al., "Optical and Electrical Properties of Undoped ZnO films Grown by Spray Pyrolysis of Zinc Nitrate Solution", Journal of Applied Physics, vol. 83, No. 4, 1998, pp. 2104-2111.
Thakoor et al., "Metal Chalcogenide-Oxide Composite Coatings Prepared by Spray Pyrolysis", Thin Solid Films, vol. 83, No. 2, Sep. 11, 1981, pp. 231-237.
Trevey et al. "Glass-ceramic $Li_2S-P_2S_5$ electrolytes prepared by a single step ball billing process and their application for all-solid-state lithium-ion batteries", Electrochemistry Communications, 2009, vol. 11, pp. 1830-1833.
Unemoto et al., "Fast lithium-ionic conduction in a new complex hydride-sulphide crystalline phase", Chemical Communications, 2016, vol. 52, pp. 564-566.
Ward et al., "$Cu(In,Ga)Se_2$ Thin-film concentrator solar cells", NCPV Prog. Rev. Meeting Lakewood, Colorado, Oct. 14-17, 2001, NREL/CP-520-31144.
Weppner et al., "Consideration of Lithium Nitride Halides as Solid Electrolytes in Practical Galvanic Cell Applications", Journal of Power Sources, vol. 6, 1981, pp. 251-259.
Zeng et al., "Realization of p-type ZnO films via monodoping of Li acceptor", Journal of Crystal Growth, 2005, vol. 283, pp. 180-184.
Zhang et al., "High-pressure high-temperature synthesis of lithiumrich $Li_3O(Cl, Br)$ and $Li_{3-x}Ca_{x/2}OCl$ anti-perovskite halides", Inorganic Chemistry Communications, 2014, vol. 48, pp. 140-143.
Zhao et al., "Superionic Conductivity in Lithium-Rich Anti-Perovskites", J. Am. Chem. Soc., 2012, vol. 134, pp. 15042-15047.

\* cited by examiner

A is LiBH$_4$:LiI (3:1); B is LiNH$_2$:LiBH$_4$:LiI (3:3:2); C is
LiNH$_2$:LiBH$_4$:LiI (9:3:4); and D is LiNH$_2$:LiBH$_4$:LiI (9:3:2)

ELECTROLYTE SEPARATORS INCLUDING LITHIUM BOROHYDRIDE AND COMPOSITE ELECTROLYTE SEPARATORS OF LITHIUM-STUFFED GARNET AND LITHIUM BOROHYDRIDE

CROSS-REFERENCE TO RELATED APPLICATION

This application claims priority to and the benefit of U.S. provisional application No. 62/411,464, filed on Oct. 21, 2016, which is incorporated by reference herein in its entirety for all purposes.

FIELD

Provided herein are novel Lithium Borohydride compositions—A.(LiBH$_4$).B.(LiX).C.(LiNH$_2$); wherein X is F, Br, Cl, I or a combination thereof; and wherein $0.1 \leq A \leq 4$, $0.1 \leq B \leq 5$, and $0 < C \leq 9.5$—suitable for use as solid-state electrolyte separators in electrochemical cells and devices. Also set forth herein are methods for making the same.

BACKGROUND OF THE INVENTION

In a rechargeable Li$^+$ ion battery, Li$^+$ ions move from a negative electrode to a positive electrode during discharge and in the opposite direction during charge. This process produces electrical energy (Energy=Voltage×Current) in a circuit connecting the electrodes, which is electrically insulated from, but parallel to, the Li$^+$ ion conduction path. The battery's voltage (V versus Li) is a function of the chemical potential difference for Li situated in the positive electrode as compared to the negative electrode. The battery's voltage is maximized when Li metal is used as the negative electrode. An electrolyte physically separates and electrically insulates the positive and negative electrodes while also providing a conduction medium for Li$^+$ ions. The electrolyte ensures that when Li metal oxidizes at the negative electrode during discharge (e.g., Li↔Li$^+$+e$^-$) and produces electrons, these electrons conduct between the electrodes by way of an external circuit which is not the same pathway taken by the Li$^+$ ions.

Conventional rechargeable batteries use liquid electrolytes to conduct lithium ions between and within the positive and negative electrodes. However, liquid electrolytes suffer from several problems including flammability during thermal runaway, outgassing at high voltages, and chemical incompatibility with lithium metal negative electrodes. As an alternative, solid electrolytes have been proposed for next generation rechargeable batteries. For example, Li$^+$ ion-conducting ceramic oxides, such as lithium-stuffed garnets, have been considered as electrolyte separators. See, for example, US Patent Application Publication No. 2015/0099190, published Apr. 9, 2015, and filed Oct. 7, 2014, titled GARNET MATERIALS FOR LI SECONDARY BATTERIES AND METHODS OF MAKING AND USING GARNET MATERIALS; U.S. Pat. Nos. 8,658,317; 8,092,941; and 7,901,658; also U.S. Patent Application Publication Nos. 2013/0085055; 2011/0281175; 2014/0093785; and 2014/0170504; also Bonderer, et al. "Free-Standing Ultrathin Ceramic Foils," *Journal of the American Ceramic Society*, 2010, 93, 3624-3631; and Murugan, et al., *Angew Chem. Int Ed.* 2007, 46, 7778-7781, the entire contents of each of these publications are incorporated by reference in their entirety for all purposes. See also, e.g., Maekawa, H. et al., *Journal of the American Chemical Society* 2009, 131, 894-895; Matsu, M. et al., *Chem. Mater.* 2010, 22, 2702-2704; Zhou, Y. et al., *Materials Transactions* 2011, 52, 654; and Borgschulte. A. et al., *Energy Environ. Set* 2012, 5, 6823-6832, the entire contents of each of these publications are incorporated by reference in their entirety for all purposes.

Solid electrolytes tend to reduce a battery's total weight and volume, when compared to a liquid electrolyte, and thereby increase its gravimetric and volumetric energy density. Despite these advantages, solid electrolytes are still insufficient in several regards for commercial applications. Notably, solid electrolytes tend to include defects, grain boundaries, pores, atomic vacancies, uneven or rough surfaces, and other inhomogeneous, non-uniform features which researchers find correlate with the formation of Li-dendrites when these electrolytes are used in electrochemical cells. A challenge in the field has been to modify and/or reduce the number of these defects.

There is therefore a need for improved materials and methods for making solid electrolytes with a reduced number of defects. What is needed are, for example, new separators, e.g., a thin film composites of a lithium-stuffed garnet with a material which passivates sites on the lithium-stuffed garnet from forming lithium dendrites. The instant disclosure provides solutions to some of these problems as well as others problems in the relevant field.

SUMMARY

In one embodiment, disclosed herein is a composition including A.(LiBH$_4$).B.(LiX).C.(LiNH$_2$) wherein X is fluorine (F), bromine (Br), chloride (Cl), iodine (I), or a combination thereof, and wherein $0.1 \leq A \leq 4$, $0.1 \leq B \leq 4$, and $0 \leq C \leq 9$.

In a second embodiment, disclosed herein is an electrochemical cell that includes a lithium metal negative electrode; a solid electrolyte separator; and a positive electrode, wherein the solid electrolyte separator is between and in direct contact with the lithium metal negative electrode and the positive electrode; and wherein the solid separator comprises a composition which includes A.(LiBH$_4$).B.(LiX).C.(LiNH$_2$) wherein X is fluorine (F), bromine (Br), chloride (Cl), iodine (I), or a combination thereof, and wherein $0.1 \leq A \leq 4$, $0.1 \leq B \leq 5$, and $0 < C \leq 9.5$.

In a third embodiment, disclosed herein is a method for making a thin film including (a) providing a powder mixture, wherein the powder mixture includes A.(LiBH$_4$).B.(LiX).C.(LiNH$_2$); wherein X is F, Br, Cl, I or a combination thereof; and wherein $0.1 \leq A \leq 4$, $0.1 \leq B \leq 5$; and $0 < C \leq 9.5$; (b) dropping, casting, or spraying the powder mixture on a substrate; (c) heating the powder mixture on a substrate to the powder mixture melting point but lower than the powder mixture decomposition temperature; and (d) cooling the powder mixture on a substrate to room temperature.

In a fourth embodiment, disclosed herein is a method for making a thin film including (a) providing a powder mixture, wherein the powder mixture includes A.(LiBH$_4$).B.(LiX).C.(LiNH$_2$); wherein X is F, Br, Cl, I or a combination thereof; and wherein $0.1 \leq A \leq 4$, $0.1 \leq B \leq 5$, and $0 < C \leq 9.5$; (b) dropping, casting, or spraying the powder mixture onto a substrate; (c) heating the powder mixture on the substrate to above the powder mixture melting point but below than the powder mixture decomposition temperature; (c) spinning the powder mixture on a substrate; and (d) cooling the powder mixture on a substrate to room temperature.

In a fifth embodiment, disclosed herein is a method for making a thin film including (a) providing a powder mixture, wherein the powder mixture includes: $A.(LiBH_4).B.(LiX)$ $.C.(LiNH_2)$; wherein X is F, Br, Cl, I or a combination thereof; and wherein $0.1 \leq A \leq 4$, $0.1 \leq B \leq 5$, and $0 < C \leq 9.5$; (b) mixing the powder mixture with a solvent to form a suspension; (c) dropping, casting, or spraying the suspension on a substrate; and (d) evaporating the solvent.

In a sixth embodiment, disclosed herein is a method for making a thin film including (a) providing a molten mixture, wherein the molten mixture comprises: $A.(LiBH_4).B.(LiX)$ $.C.(LiNH_2)$; wherein X is F, Br, Cl, I or a combination thereof; and wherein $0.1 \leq A \leq 4$; $0.1 \leq B \leq 5$, and $0 < C \leq 9.5$; (b) dip-coating a substrate in the molten mixture, (c) withdrawing the substrate; and (d) cooling the substrate to room temperature.

In a seventh embodiment, disclosed herein is a method for making a thin film including (a) providing a molten mixture, wherein the powder mixture includes $A.(LiBH_4).B.(LiX).C.$ $(LiNH_2)$; wherein X is F, Br, Cl, I or a combination thereof; an wherein $0.1 \leq A \leq 4$, $0.1 \leq B \leq 5$, and $0 < C \leq 9.5$; (b) dip-coating a substrate in the molten mixture, (c) withdrawing the substrate; and (d) cooling the substrate.

In an eighth embodiment, disclosed herein is a method for making a multilayer component including (a) providing a first composition, wherein the composition includes $A.(LiBH_4).B.(LiX).C.(LiNH_2)$; wherein X is F, Br, Cl, I or a combination thereof; and wherein $0.1 \leq A \leq 4$, $0.1 \leq B \leq 5$, and $0 < C \leq 9.5$; (b) dropping or spraying the powder mixture on a substrate; (c) heating the powder mixture on the substrate to above the powder mixture melting point but below than the powder mixture decomposition temperature; (e) providing a layer of a second composition on top of the powder mixture on a substrate to form a multilayer; (f) applying 1 pound-per-square inch (PSI) to 1000 PSI pressure to the multilayer; and (f) cooling the powder mixture on a substrate to room temperature.

In a ninth embodiment, disclosed herein is a method for coating a lithium-ion conducting separator electrolyte, the method including (a) providing a lithium-ion conducting separator electrolyte; and (b) pressing a composition of $A.(LiBH_4).B.(LiX).C.(LiNH_2)$; wherein X is fluorine, bromine, chloride, iodine, or a combination thereof; and wherein $0.1 \leq A \leq 4$, $0.1 \leq B \leq 5$, and $0 < C \leq 9.5$ on to at least one surface of the lithium-ion conducting separator electrolyte; wherein the pressing is at a temperature between 100-280° C. and at a pressure of 10-2000 PSI.

In a tenth embodiment, disclosed herein is a method for coating a lithium-ion conducting electrolyte separator, the method including (a) providing a lithium-ion conducting electrolyte separator; (b) providing a mixture of a solvent and a composition of $A.(LiBH_4).B.(LiX).C.(LiNH_2)$; wherein X is fluorine, bromine, chloride, iodine, or a combination thereof; and wherein $0.1 \leq A \leq 4$, $0.1 \leq B \leq 5$, and $0 < C \leq 9.5$; and (c) depositing the mixture on the separator by spray coating, melt spin coating, spin coating, dip coating, slot die coating, gravure coating, or microgravure coating.

In an eleventh embodiment, disclosed herein is a method for making a thin film including a composition comprising $A.(LiBH_4).B.(LiX).C.(LiNH_2)$, wherein X is fluorine, bromine, chlorine, iodine, or a combination thereof, and wherein $0.1 \leq A \leq 4$, $0.1 \leq B \leq 5$, and $0 < C \leq 9.5$, the method including (a) providing a molten mixture, wherein the mixture includes $A.(LiBH_4).B.(LiX).C.(LiNH_2)$, wherein X is fluorine, bromine, chlorine, iodine, or a combination thereof, and wherein $0.1 \leq A \leq 4$, $0.1 \leq B \leq 5$, and $0 < C \leq 9.5$; (b) dip-coating a substrate in the molten mixture; (c) withdrawing the substrate; and (d) cooling the substrate to room temperature.

In a twelfth embodiment, disclosed herein is a method for coating a lithium ion conducting separator electrolyte, the method including (a) providing a lithium ion conducting separator electrolyte; and (b) laminating a composition of $A.(LiBH_4).B.(LiX).C.(LiNH_2)$, wherein X is fluorine, bromine; chlorine, iodine; or a combination thereof, to the lithium ion conducting separator electrolyte, and wherein $0.1 \leq A \leq 4$, $0.1 \leq B \leq 5$, and $0 < C \leq 9.5$ at a temperature between 100-280° C. at a pressure of 10-2000 pounds per square inch (PSI) on at least one surface of the lithium ion conducting separator electrolyte.

In thirteenth embodiment, disclosed herein is a method for coating a lithium ion conducting separator electrolyte, the method including (a) providing a lithium ion conducting separator electrolyte; and (b) drop-casting a powder of a composition of $A.(LiBH_4).B.(LiX).C.(LiNH_2)$, wherein X is fluorine, bromine, chlorine, iodine, or a combination thereof, and wherein $0.1 \leq A \leq 3$, $0.1 \leq B \leq 4$, and $0 \leq C \leq 9$ on at least one surface of the lithium ion conducting separator electrolyte; (c) heating the powder on at least one surface of the lithium ion conducting separator electrolyte to a temperature between 100-280° C.; (d) optionally removing excessive material above a determined film thickness; and e) cooling the substrate to 100° C.

In fourteenth embodiment, disclosed herein is a method for coating a solid-state cathode film, the method including (a) providing a solid-state cathode film; and (b) drop-casting a powder of a composition of $A.(LiBH_4).B.(LiX).C.$ $(LiNH_2)$, wherein X is fluorine, bromine, chlorine, iodine, or a combination thereof, and wherein $0.1 \leq A \leq 3$, $0.1 \leq B \leq 4$, and $0 \leq C \leq 9$, on at least one surface of the solid-state cathode; (c) heating to a temperature between 100-280° C.; (d) optionally removing excessive material above a determined film thickness; and (e) cooling the substrate to 100° C.

In fifteenth embodiment, disclosed herein is a method to bonding a lithium ion conducting separator electrolyte and a solid-state cathode or another lithium ion conducting separator electrolyte with a molten composition of $A.(LiBH_4)$ $.B.(LiX).C.(LiNH_2)$, wherein X is fluorine, bromine, chloride, iodine, or a combination thereof, and wherein $0.1 \leq A \leq 3$, $0.1 \leq B \leq 4$, and $0 \leq C \leq 9$; wherein the method includes (a) providing a first layer of a lithium ion conducting separator electrolyte; and (b) drop-casting a powder of a composition of $A.(LiBH_4).B.(LiX).C.(LiNH_2)$, wherein X is fluorine, bromine, chlorine, iodine, or a combination thereof, and wherein $0.1 \leq A \leq 3$, $0.1 \leq B \leq 4$, and $0 \leq C \leq 9m$ on at least one surface of the lithium ion conducting separator electrolyte; (c) heating the powder on at least one surface of the lithium ion conducting separator electrolyte to a temperature between 100-280° C.; (d) placing a second layer on the first layer, wherein the second layer includes a solid-state cathode film or a lithium ion conducting separator; e) pressing the stack at a pressure of 10-2000 pounds per square inch (PSI); and f) cooling the stack to room temperature.

In sixteenth embodiment, disclosed herein is a method to bonding a lithium ion conducting separator electrolyte and a solid-state cathode or another lithium ion conducting separator electrolyte with a molten composition of $A.(LiBH_4).B.$ $(LiX).C.(LiNH_2)$, wherein X is fluorine, bromine, chloride, iodine, or a combination thereof, and wherein $0.1 \leq A \leq 3$, $0.1 \leq B \leq 4$, and $0 \leq C \leq 9$; wherein the method includes (a) providing a first lithium ion conducting separator electrolyte on a substrate; and b) drop-casting a powder of a composition of $A.(LiBH_4).B.(LiX).C.(LiNH_2)$, wherein X is fluorine, bromine, chlorine, iodine, or a combination thereof, and wherein $0.1 \leq A \leq 3$; $0.1 \leq B \leq 4$, and $0 \leq C \leq 9$ on at least one surface of the lithium ion conducting separator electrolyte;

(c) heating the powder on at least one surface of the lithium ion conducting separator electrolyte to a temperature between 100-280° C.; (d), rotating the substrate at a speed of 100-5000 rpm while at a temperature between 100-280° C.; (e) optionally ceasing rotation of the substrate; (f) laminating a second layer, comprising a solid-state cathode film or a lithium ion conducting separator at a pressure of 10-2000 pounds per square inch (PSI) on to the heat-treated powder on at least one surface of the lithium ion conducting separator electrolyte; and g) cooling the heat-treated powder on at least one surface of the lithium ion conducting separator electrolyte to room temperature.

In an seventeenth embodiment, disclosed herein is a method for coating a separator, the method including a) providing a separator; b) providing a mixture of a solvent and a composition comprising $A.(LiBH_4).B.(LiX).C.(LiNH_2)$, wherein X is fluorine, bromine, chlorine, iodine, or a combination thereof, and wherein $0.1 \leq A \leq 3$, $0.1 \leq B \leq 4$, and $0 \leq C \leq 9$; and c) depositing the mixture on the separator by spray coating, spin coating, dip coating, slot die coating, gravure coating, or microgravure coating.

In eighteenth embodiment, disclosed herein is a method for coating a separator, the method including a) providing a separator; b) providing molten $A.(LiBH_4).B.(LiX).C.(LiNH_4)$, wherein X is fluorine, bromine, chlorine, iodine, or a combination thereof, and wherein $0.1 \leq A \leq 3$, $0.1 \leq B \leq 4$, and $0 \leq C \leq 9$; and c) depositing the molten $A.(LiBH_4).B.(LiX).C.(LiNH_2)$ on the separator by spray coating, spin coating, dip coaling, slot die coating, gravure coating, or microgravure coating.

In a nineteenth embodiment, also disclosed herein are novel electrochemical devices which incorporate the compositions set forth herein. For example, disclosed herein is an electrochemical cell having a lithium metal negative electrode; a solid separator; and a positive electrode, wherein the solid separator includes a lithium-stuffed garnet and $A.(LiBH_4).B.(LiX).C.(LiNH_2)$, wherein X is fluorine, bromine, chlorine, iodine, or a combination thereof, and wherein $0.1 \leq A \leq 3$, $0.1 \leq B \leq 4$, and $0 \leq C \leq 9$.

DETAILED DESCRIPTION OF THE INVENTION

Figure 1:
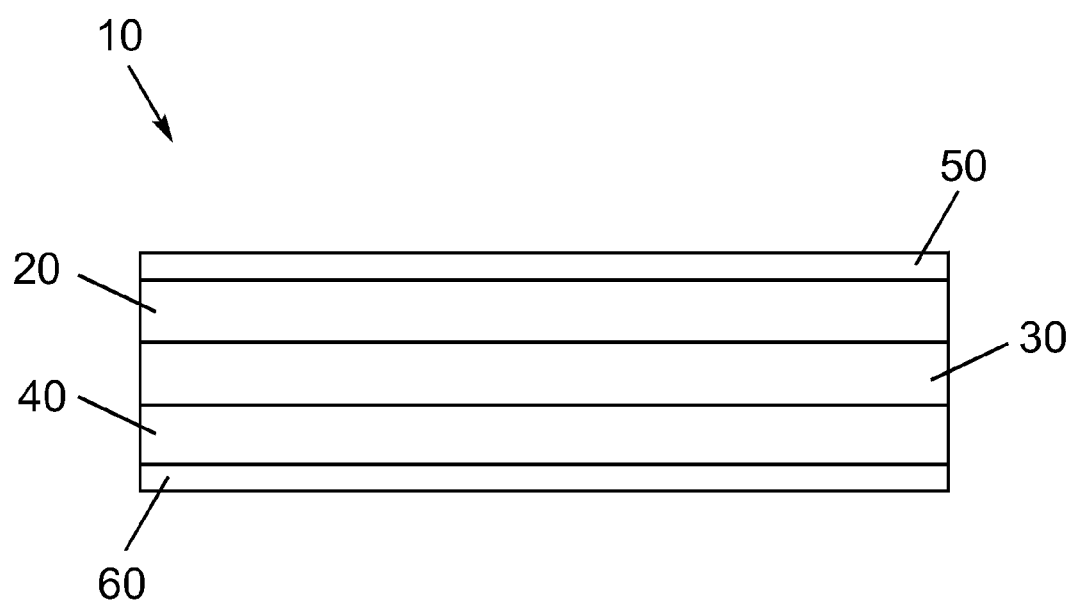
FIG. 1 shows one embodiment of an energy storage device 10 including a cathode 20, a solid-state ion conductor 30, an anode 40, and current collectors 50 and 60.

The following description is presented to enable one of ordinary skill in the art to make and use the inventions set forth herein and to incorporate these inventions in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but is to be accorded the widest scope consistent with the principles and novel features disclosed herein.

Furthermore, any element in a claim that does not explicitly state "means for" performing a specified function, or "step for" performing a specific function, is not to be interpreted as a "means" or "step" clause as specified in pre-America Invents Act (AIA) 35 U.S.C. Section 112, Paragraph 6 or post-AIA 35 U.S.C. Section 112(f). In particular, the use of "step of" or "act of" in the Claims herein is not intended to invoke the provisions of pre-AIA 35 U.S.C. Section 112, Paragraph 6 or post-MA 35 U.S.C. Section 112(f).

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

General

Disclosed herein are compositions that include $LiBH_4$ optionally with a Lithium Halide (e.g., LiCl, LiBr, or LiI) and optionally with a Li Amide (e.g., $LiNH_2$). Also set forth herein are methods for making and using such compositions to prepare thin film solid electrolytes for solid-state lithium-secondary batteries. Also set forth herein are certain improved solid electrolytes which are prepared by passivating the defects in solid separators (e.g., lithium-stuffed garnet) by coating or co-formulating chemical agents [e.g., LiI $(LiBH_4).(LiX).(LiNH_2)$] with the solid separators.

Definitions

If a definition provided in any material incorporated by reference herein conflicts with a definition provided herein, the definition provided herein controls.

As used herein, the phrase "solid-state cathode" or "solid-state positive electrode" refers to a type of "positive electrode" defined herein. All components in this solid-state cathode film are in solid form. The solid-state cathode includes active cathode materials as defined herein, solid-state catholyte as defined herein, optionally a conductive additive, and optionally binders. The solid-state cathode are in some examples densified films.

As used herein, the phrase "current collector" refers to a component or layer in a secondary battery through which electrons conduct, to or from an electrode in order to complete an external circuit, and which are in direct contact with the electrode to or from which the electrons conduct. In some examples, the current collector is a metal (e.g., Al, Cu, or Ni, steel, alloys thereof, or combinations thereof) layer which is laminated to a positive or negative electrode. In some examples, the current collector is Al. In some examples, the current collector is Cu. In some examples, the current collector is Ni. In some examples, the current collector is steel. In some examples, the current collector is an alloy of Al. In some examples, the current collector is an alloy of Cu. In some examples, the current collector is an alloy of steel. In some examples, the current collector is Al. In some examples, the current collector comprises a combination of the above metals. During charging and discharging, electrons move in the opposite direction to the flow of Li ions and pass through the current collector when entering or exiting an electrode.

As used herein, the phrase "at least one member selected from the group," includes a single member from the group, more than one member from the group, or a combination of members from the group. At least one member selected from the group consisting of A, B, and C includes, for example, A, only, B, only, or C, only, as well as A and B as well as A and C as well as B and C as well as A, B, and C or any other all combinations of A, B, and C.

As used herein, the phrase "slot casting," or "slot die coating" refers to a deposition process whereby a substrate is coated, or deposited, with a solution, liquid, slurry, or the like by flowing the solution, liquid, slurry, or the like, through a slot or mold of fixed dimensions that is placed adjacent to, in contact with, or onto the substrate onto which the deposition or coating occurs. In some examples, slot casting includes a slot opening of about 1 to 100 μm.

As used herein, the phrase "dip casting" or "dip coating" refers to a deposition process whereby a substrate is coated, or deposited, with a solution, liquid, slurry, or the like, by moving the substrate into and out of the solution, liquid, slurry, or the like, often in a vertical fashion, sometimes at an angle, such as 45° from the surface of the solution, liquid slurry, or the like.

As used herein, the phrase "solid-state catholyte," or the term "catholyte" refers to an ion conductor that is intimately mixed with, or surrounded by, a cathode (i.e., positive electrode) active material (e.g., a metal fluoride optionally including lithium).

As used herein, the term "electrolyte," refers to a material that allows ions, e.g., $Li^+$, to migrate therethrough, but which does not allow electrons to conduct therethrough. Electrolytes are useful for electrically insulating the cathode and anode of a secondary battery while allowing ions, e.g., Li', to transmit through the electrolyte. Solid electrolytes, in particular, rely on ion hopping and/or diffusion through rigid structures. Solid electrolytes may be also referred to as fast ion conductors or super-ionic conductors. In this case, a solid electrolyte layer may be also referred to as a solid electrolyte separator.

As used herein, the term "anolyte," refers to an ionically conductive material that is mixed with, or layered upon, or laminated to, an anode material or anode current collector.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein the phrase "energy storage electrode," refers to, for example, an electrode that is suitable for use in an energy storage device, e.g., a lithium rechargeable battery or Li-secondary battery. As used herein, such an electrode is capable of conducting electrons and Li ions as necessary for the charging and discharging of a rechargeable battery.

As used herein, the phrase "providing" refers to the provision of, generation or, presentation of, or delivery of that which is provided.

As used herein, the phrase "lithium-stuffed garnet" refers to oxides that are characterized by a crystal structure related to a garnet crystal structure. Examples of lithium-stuffed garnets are set forth in U.S. Patent Application Publication No. 2015/0099190, which published Apr. 9, 2015, and was filed Oct. 7, 2014 as Ser. No. 14/509,029, and is incorporated by reference herein in its entirety for all purposes. This application describes Li-stuffed garnet solid-state electrolytes used in solid-state lithium rechargeable batteries. These Li-stuffed garnets generally having a composition according to $Li_A La_B M'_C M''_D Zr_E O_F$, $Li_A La_B M'_C M''_D Ta_E O_F$, or $Li_A La_B M'_C M''_D Nb_E O_F$, wherein $4<A<8.5$, $1.5<B<4$, $0 \leq C \leq 2$, $0 \leq D \leq 2$; $0 \leq E<3$, $10<F<13$, and M' and M" are each, independently in each instance selected from Ga, Al, Mo, W, Nb, Sb, Ca, Ba, Sr, Ce, Hf, Rb, and Ta, or $Li_a La_b Zr_c Al_d Me''_e O_f$, wherein $5<a<8.5$; $2<b<4$; $0<c \leq 2.5$; $0 \leq d<2$; $0 \leq e<2$, and $10<f<13$ and Me" is a metal selected from Ga, Nb, Ta, V, W, Mo, and Sb and as otherwise described in U.S. Patent Application Publication No. 2015/0099190. As used herein, lithium-stuffed garnets, and garnets, generally, include, but are not limited to, $Li_{7.0\pm\delta} La_3 (Zr_{t1}+Nb_{t2}+Ta_{t3})O_{12}+ 0.35 Al_2 O_3$; wherein δ is from 0 to 3 and (t1+t2+t3=2) so that the La:(Zr/Nb/Ta) ratio is 3:2. For example, 6 is 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. In some examples, the Li-stuffed garnet herein has a composition of $Li_{7\pm\delta} Li_3 Zr_2 O_{12} \cdot x Al_2 O_3$. In yet another embodiment, the Li-stuffed garnet herein has a composition of $Li_{7\pm\delta} Li_3 Zr_2 O_{12} \cdot 0.22 Al_2 O_3$. In yet other examples, the Li-stuffed garnet herein has a composition of $Li_{7\pm\delta} Li_3 Zr_2 O_{12} \cdot 0.35 Al_2 O_3$. In certain other examples, the Li-stuffed garnet herein has a composition of $Li_{7\pm\delta} Li_3 Zr_2 O_{12} \cdot 0.5 Al_2 O_3$. In another example, the Li-stuffed garnet herein has a composition of $Li_{7\pm\delta} Li_3 Zr_2 O_{12} \cdot 0.75 Al_2 O_3$. Also, L-stuffed garnets used herein include, but are not limited to, $Li_x La_3 Zr_2 O_F + y Al_2 O_3$, wherein x ranges from 5.5 to 9; and y ranges from 0.05 to 1. In these examples, subscripts x, y, and F are selected so that the Li-stuffed garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and v is 0.22. In some examples, x is 8 and y is 0.22. In some examples, x is 9 and y is 0.22. Also, Li-stuffed garnets as used herein include, but are not limited to, $Li_x La_3 Zr_2 O_{12} + y Al_2 O_3$, wherein y is from 0 to 1 and includes 0 and 1. In one embodiment, the Li-stuffed garnet herein has a composition of $Li_7 Li_3 Zr_2 O_{12}$.

As used herein, garnet or Li-stuffed garnet does not include YAG-garnets yttrium aluminum garnets, or, e.g., $Y_3 Al_5 O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3 Y_2 (SiO_4)_3$ wherein X is Ca, Mg, Fe, and, or, Mn; and Y is Al, Fe, and, or, Cr.

As used herein, the phrases "garnet precursor chemicals," "chemical precursor to a garnet-type electrolyte," "precursors to garnet" and "garnet precursor materials" refer to chemicals which react to form a lithium-stuffed garnet material described herein. These chemical precursors include, but are not limited to lithium hydroxide (e.g., LiOH), lithium oxide (e.g., $Li_2 O$), lithium carbonate (e.g., $LiCO_3$), zirconium oxide (e.g., $ZrO_2$), lanthanum oxide (e.g., $La_2 O_3$), lanthanum hydroxide (e.g., $La(OH)_3$), aluminum oxide (e.g., $Al_2 O_3$), aluminum hydroxide (e.g., Al$(OH)_3$), AlOOH, aluminum (e.g., Al), Boehmite, gibbsite, corundum, aluminum nitrate (e.g., $Al(NO_3)_3$), aluminum nitrate nonahydrate, niobium oxide (e.g., $Nb_2 O_5$), gallium oxide ($Ga_2 O_3$), and tantalum oxide (e.g., $Ta_2 O_5$). Other precursors to garnet materials, known in the relevant field to which the instant disclosure relates, may be suitable for use with the methods set forth herein.

As used herein the phrase "garnet-type electrolyte," refers to an electrolyte that includes a lithium-stuffed garnet material described herein as a Li$^+$ ion conductor. The advantages of Li-stuffed garnet solid-state electrolytes are many, including as a substitution for liquid, flammable electrolytes commonly used in lithium rechargeable batteries.

As used herein, the phrase "doped with alumina" means that $Al_2 O_3$ is used to replace certain components of another material, e.g., a garnet. A lithium-stuffed garnet that is doped with $Al_2 O_3$ refers to garnet wherein aluminum (Al) substitutes for an element in the lithium-stuffed garnet chemical formula, which may be, for example, Li or Zr.

As used herein, the phrase "subscripts and molar coefficients in the empirical formulas are based on the quantities of raw materials initially batched to make the described examples" means the subscripts, (e.g., 7, 3, 2, 12 in $Li_7 La_3 Zr_2 O_{12}$ and the coefficient 0.35 in $0.35 Al_2 O_3$) refer to the respective elemental ratios in the chemical precursors (e.g., LiOH, $La_2 O_3$, $ZrO_2$, $Al_2 O_3$) used to prepare a given material, (e.g., $Li_7 La_3 Zr_2 O_{12} \cdot 0.35 Al_2 O_3$), unless specified otherwise.

As used herein, the phrase "electrochemical device" refers to an energy storage device, such as, but not limited to a Li-secondary battery that operates or produces electricity or an electrical current by an electrochemical reaction, e.g., a conversion chemistry reaction such as $3Li + FeF_3 \leftrightarrow 3LiF + Fe$.

As used herein, the phrase "film thickness" refers to the distance, or median measured distance, between the top and bottom faces of a film. As used herein, the top and bottom faces refer to the sides of the film having the largest surface area.

As used herein, the term "grains" refers to domains of material within the bulk of a material that have a physical boundary which distinguishes the grain from the rest of the material. For example, in some materials both crystalline and amorphous components of a material, often having the same chemical composition, are distinguished from each other by the boundary between the crystalline component and the amorphous component, or a boundary between regions of different crystalline orientation. The approximate diameter of the region between boundaries of a crystalline component, or of an amorphous component, is referred herein as the grain size. Grains may be observed in SEM if appropriate techniques are applied to bring the grains into higher relief; these techniques may include chemical etching or exposure to high energy electron beams.

As used herein, the term "diameter ($d_{90}$)" refers to the size, in a distribution of sizes, measured by microscopy techniques or other particle size analysis techniques, including, but not limited to, scanning electron microscopy or dynamic light scattering. $D_{90}$ includes the characteristic dimension at which 90% of the particles are smaller than the recited size. Similarly, the term "diameter ($d_{50}$)" includes the characteristic dimension at which 50% of the particles are smaller than the recited size. Similarly, the term "diameter ($d_{10}$)" includes the characteristic dimension at which 10% of the particles are smaller than the recited size. These figures may be calculated on a per-volume or per-number basis.

As used herein the phrase "active anode material" refers to an anode material that is suitable for use in a Li rechargeable battery that includes an active cathode material as defined above. In some examples, the active material is Lithium metal.

As used herein the phrase "casting a film," refers to the process of delivering or transferring a liquid or a slurry into a mold, or onto a substrate, such that the liquid or the slurry forms, or is formed into, a film. Casting may be done via doctor blade, meyer rod, comma coater, gravure coater, microgravure, reverse comma coater, slot dye, slip and/or tape casting, and other methods known to those skilled in the art.

As used herein the phrase "applying a pressure," refers to a process whereby an external device, e.g., a calendar, induces a pressure in another material.

As used herein the phrase "average pore diameter dimensions of about 5 nm to about 1 µm" refers to a material that has pores wherein the inner diameter of the pores therein are physically spaced by about 5 nm, for nanopores for example, to about 1 µm, for micropores for example.

As used herein the term "infiltrated," refers to the state wherein one material passes into another material, or when one material is caused to join another material. For example, if a porous Garnet is infiltrated with LBHI, this refers to the process whereby LBHI is caused to pass into and intimately mix with the porous Garnet.

As used herein, the terms "separator," and "Li$^+$ ion-conducting separator," are used interchangeably with separator being a short-hand reference for Li$^+$ ion-conducting separator, unless specified otherwise explicitly. A separator refers to a solid electrolyte which conducts Li$^+$ ions, is substantially insulating to electrons, and which is suitable for use as a physical barrier or spacer between the positive and negative electrodes in an electrochemical cell or a rechargeable battery. A separator, as used herein, is substantially insulating when the separator's lithium ion conductivity is at least $10^3$, and typically $10^6$ times, greater than the separator's electron conductivity. A separator can be a film, monolith, or pellet. Unless explicitly specified to the contrary, a separator as used herein is stable when in contact with lithium metal.

As used here, the phrase "inorganic solid-state electrolyte," is used interchangeably with the phrase "solid separator" refers to a material which does not include carbon and which conducts atomic ions (e.g., Li$^+$) but does not conduct electrons. An inorganic solid-state electrolyte is a solid material suitable for electrically isolating the positive and negative electrodes of a lithium secondary battery while also providing a conduction pathway for lithium ions. Example inorganic solid-state electrolytes include oxide electrolytes and sulfide electrolytes, which are further defined below. Non-limiting example sulfide electrolytes are found, for example, in U.S. Pat. No. 9,172,114, which issued Oct. 27, 2015, and also in US Patent Application Publication No. 2017-0162901 A1, which published Jun. 8, 2017, and was filed as U.S. patent application Ser. No. 15/367,103 on Dec. 1, 2016, the entire contents of which are herein incorporated by reference in its entirety for all purposes. Non-limiting example oxide electrolytes are found, for example, in US Patent Application Publication No. 2015-0200420 A1, which published Jul. 16, 2015, the entire contents of which are herein incorporated by reference in its entirety for all purposes. In some examples, the inorganic solid-state electrolyte also includes a polymer.

As used herein, the phrase "lithium interfacial resistance," refers to the interfacial resistance of a material towards the incorporation of Li$^+$ ions. A lithium interfacial ASR (AS-$R_{interface}$) is calculated from the interfacial resistance ($R_{interface}$), by the equation $ASR_{interface}=R_{interface}*A/2$, where A is the area of the electrodes in contact with the separator and the factor of 2 accounts for 2 interfaces when measured in a symmetric cell and $R_{interface}=R_{total}-R_{bulk}$.

As used herein "ASR" refers to area-specific resistance. ASR is measured using electrochemical impedance spectroscopy (EIS). EIS can be performed on a Biologic VMP3 instrument or an equivalent thereof. In an ASR measurement lithium contacts are deposited on two sides of a sample. An AC voltage of 25 mV rms is applied across a frequency of 300 kHz-0.1 mHz while the current is measured. EIS partitions the ASR into the bulk contribution and the interfacial ASR contribution, by resolving two semicircles in a Nyquist plot.

As used herein, the term "LIRAP" refers to a lithium rich antiperovskite and is used synonymously with "LOC" or "Li$_3$OCl". The composition of LIRAP is $aLi_2O+bLiX+cLiOH+dAl_2O_3$ where X=Cl, Br, and/or I, a/b=0.7-9, c/a=0.01-1, d/a=0.001-0.1.

As used herein, the term "LPS+X" refers to a lithium conducting electrolyte comprising Li, P, S, and X, where X=Cl, Br, and/or I. For example, "LSPI" refers to a lithium conducting electrolyte comprising Li, P, S, and I. More generally, it is understood to include $aLi_2S+bP_2S_y+cLiX$ where X=Cl, Br, and/or I and where y=3-5 and where a/b=2.5-4.5 and where (a+b)/c=0.5-15.

As used herein, "LSS" refers to lithium silicon sulfide which can be described as Li$_2$S—SiS$_2$, Li—SiS$_2$, Li—S—Si, and/or a catholyte consisting essentially of Li, S, and Si. LSS refers to an electrolyte material characterized by the formula Li$_x$Si$_y$S$_z$ where $0.33 \leq x \leq 0.5$, $0.1 \leq y \leq 0.2$, $0.4 \leq z \leq 0.55$, and it may include up to 10 atomic % oxygen. LSS also refers to an electrolyte material comprising Li, Si, and S. In some examples, LSS is a mixture of Li$_2$S and SiS$_2$. In some examples, the ratio of Li$_2$S:SiS$_2$ is 90:10, 85:15, 80:20, 75:25, 70:30, 2:1, 65:35, 60:40, 55:45, or 50:50 molar ratio. LSS may be doped with compounds such as Li$_x$PO$_y$, Li$_x$BO$_y$, Li$_4$SiO$_4$, Li$_3$MO$_4$, Li$_3$MO$_3$, PS$_x$, and/or lithium halides such as, but not limited to, LiI, LiCl, LiF, or LiBr, wherein $0<x \leq 5$ and $0<y \leq 5$.

As used herein, the term "SLOPS" refers to unless otherwise specified, a 60:40 molar ratio of Li$_2$S:SiS$_2$ with 0.1-10 mol. % Li$_3$PO$_4$. In some examples, "SLOPS"

includes $Li_{10}Si_4S_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula $(1-x)(60:40\ Li_2S:SiS_2)*(x)(Li_3PO_4)$, wherein x is from 0.01 to 0.99. As used herein, "LBS-POX" refers to an electrolyte composition of $Li_2S:B_2S_3:Li_3PO_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, the term "LSTPS" refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where $2≤a≤8$, $0.5≤b≤2.5$, $4≤c≤12$, and $d<3$. LXPSO refers to LXPS, as defined above, and having oxygen doping at from 0.1 to about 10 atomic %. LPSO refers to LPS, as defined above, and having oxygen doping at from 0.1 to about 10 atomic %.

As used herein, "LTS" refers to a lithium tin sulfide compound which can be described as $Li_2S:SnS_2:As_2S_5$, $Li_2S$—$SnS_2$, $Li_2S$—$SnS$, Li—S—Sn, and/or a catholyte consisting essentially of Li, S, and Sn. The composition may be $Li_xSn_yS_z$ where $0.25≤x≤0.65$, $0.05≤y≤0.2$, and $0.25≤z≤0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In and/or lithium halides such as, but not limited to, LiI, LiCl, LiF, or LiBr.

As used herein, the term "LATS" refers to an LTS further including Arsenic (As).

As used here, the term "transparent" refers to a material that has a transmission coefficient of greater than 0.9 when measured with incident light at a wavelength between 400-700 nm. As used here, the term "translucent" refers to a material that has a transmission coefficient of between 0.1-0.9 when measured with incident light at a wavelength between 400-700 nm.

As used herein, the phrase "transmission coefficient," refers to the ratio of the amount of incident light which transmits through a material with respect to the total amount of incident light. A transmission coefficient of 0.5 means that half of the incident light which impinges upon a material transmits through that material.

As used herein, the term "thin film" refers to a film having the components, compositions, or materials described herein where the film has an average thickness dimension of about 10 nm to about 100 μm. In some examples, thin refers to a film that is less than about 1 μm, 10 μm, or 50 μm in thickness.

As used herein, the term "monolith," refers to a separator having a density which is at least as dense as a film, but wherein the monolith is thicker than a thin film by at least a factor of two (2) or more. A monolith is to be distinguished from a composite in that a composite includes more than one type of material whereas a monolith is homogeneous and made of a single type of material. That is, a "monolith" refers to an object having a single or uniform body. A monolith is a "shaped, fabricated, intractable article with a homogeneous microstructure which does not exhibit any structural components distinguishable by optical microscopy." Typical fabrication techniques for forming the article include, but are not limited to, cold pressing or hot pressing of a polymeric material, and using a reactive processing technique such as reaction injection molding, crosslinking, sol-gel processing, sintering, and the like As used herein, a monolith and a sintered film have substantially the same density when both are prepared substantially defect free. Herein, substantially defect free is a material having approximately 0.0001% defects per volume.

As used herein, the term "pellet" refers to a small unit of bulky material compressed into any of several shapes and sizes, e.g., cylindrical, rectangular, or spherical. The compressed material is disc-shaped and may be 5-20 cm in diameter and 0.5 to 2 cm in height. Typically, the compressed material is disc-shaped and 10 cm in diameter and 1 cm in height. Pellets may also include additional agents to help bind the material compressed into the pellet. In some examples, these additional agents are referred to as binding agents and may include, but are not limited to, polymers such as poly(ethylene)oxide. In some examples, polyvinyl butyral is used as a binding agent. Pellets are typically made by pressing a collection of powder materials in a press. This pressing makes the powder materials adhere to each other and increases the density of the collection of powder material when compared to the density of the collection of powder material before pressing. In some instances, the powder material is heated and/or an electrical current is passed through the powder material during the pressing.

As used herein, the term "pressed pellet" refers to a pellet having been submitted to a pressure (e.g., 5000 PSI) to further compress the pellet.

As used herein, the term "oxide" refers to a chemical compound that includes at least one oxygen atom and one other element in the chemical formula for the chemical compound. For example, an "oxide" is interchangeable with "oxide electrolytes." Non-limiting examples of oxide electrolytes are found, for example, in US Patent Application Publication No. 2015/0200420, published Jul. 16, 2015, the contents of which are incorporated herein by reference in their entirety.

As used herein, the term "sulfide" refers to refers to a chemical compound that includes at least one sulfur atom and one other element in the chemical formula for the chemical compound. For example, a "sulfide" is interchangeable with "sulfide electrolytes." Non-limiting examples of sulfide electrolytes are found, for example, in U.S. Pat. No. 9,172,114, issued Oct. 27, 2015, and also in US Patent Application Publication No. 2017-0162901 A1, which published Jun. 8, 2017, and was filed as U.S. patent application Ser. No. 15/367,103 on Dec. 1, 2016, the entire contents of which are herein incorporated by reference in its entirety for all purposes.

As used herein, the term "sulfide-halide" refers to a chemical compound that includes at least one sulfur atom, at least one halogen atom, and one other element in the chemical formula for the chemical compound.

As used herein, the term "total effective lithium ion conductivity" of a material refers to $L/R_{bulk}A$, where L is the total thickness of the material, A is the measurement area, for example, the interfacial contact area of electrodes in contact with the material, and $R_{bulk}$ is the bulk resistance of the material measured, for example, by electrochemical impedance spectroscopy.

As used herein, the term "LBHI" or "LiBHI" refers to a lithium conducting electrolyte having Li, B, H, and I. More generally, it is understood to include $aLiBH_4+bLiX$ where X=Cl, Br, and/or I and where a:b=7:1, 6:1, 5:1, 4:1, 3:1, 2:1, or within the range a/b=2-4. LBHI may further include nitrogen in the form of $aLiBH_4+bLiX+cLiNH_2$ where (a+c)/b=2-4 and c/a=0-10.

As used herein, the term "LBHXN" refers to a composition characterized as $A.(LiBH_4).B.(LiX).C.(LiNH_2)$ wherein X is fluorine (F), bromine (Br), chloride (Cl), iodine (I), or a combination thereof, and wherein $0.1 \leq A \leq 4$, $0.1 \leq B \leq 4$, and $0 \leq C \leq 9$.

As used herein, the term "conformally bonded" refers to the bonding of a composition to a substrate where the idiosyncratic defects of the substrate are unchanged yet masked or smoothened by the bonding of the composition to the substrate.

As used herein, the term "gravure coating" or "microgravure coating" refers to a process in which a substrate is contacted with a liquid via a roll-to-roll process. A roll surface is engraved with a pattern of cells that provide a desired coating volume. The roll is mounted in bearings and is rotated while partially submerged in a receptacle holding the liquid to be coated onto the substrate. Rotation of the roll permits the substrate to acquire the coating, which is premetered with a flexible blade (e.g., a doctor blade) as the roll rotates toward a contact point with the substrate. Typically, gravure coating includes a backing roll having approximately the same diameter as the engraved roll.

As used herein, the term "through-pores" in a material refers to a gap or void that extends through the entirety of the material.

As used herein, the term "surface pores" in a material refers to a gap, cavity, or void that resides at the surface of a substrate.

As used herein, the term "amorphous," refers to a material that is not crystalline or that does not contain a majority crystalline phase. Amorphous refers to a material that does not evidence a crystalline property, for example, well-defined x-ray diffraction peaks as measured by x-ray diffraction. An amorphous material is at least primarily amorphous and characterized as having more amorphous components than crystalline components. Substantially amorphous refers to a material that does not include well defined x-ray diffraction peaks or that is characterized by an x-ray diffraction pattern that includes broad reflections that are recognized by a person having ordinary skill in the art as having the majority constituent component phase as an amorphous phase. A material that is substantially amorphous may have nano-sized domains of crystallinity, but which are still characterized by an x-ray diffraction pattern to be primarily in an amorphous phase. In a substantially amorphous material, transmission electron microscopy (TEM) selected area diffraction pattern (SADP) may evidence regions of crystallinity, but would also evidence a majority of the volume of the material as amorphous.

As used herein, the term "semiamorphous" or "semicrystalline" refers to a composition having both crystalline and amorphous domains. A semi-crystalline material includes both nanocrystalline and/or microcrystalline components in addition to amorphous components. A semi-crystalline material is a material that is partially crystallized or is a material that includes some crystalline bulk and some amorphous bulk. For example, a material heated to its crystallization temperature, but subsequently cooled before the entirety of the material is able to crystallize, completely, is referred to herein as semi-crystalline material. As used herein, a semi-crystalline material can be characterized by an XRD powder pattern in which the primary peak of highest intensity has a full width at half maximum of at least 1° (2Θ), or at least 2° (2Θ), or at least 3° (2Θ).

As used herein, "SLOBS" includes, unless otherwise specified, a 60:40 molar ratio of $Li_2S:SiS_2$ with 0.1-10 mol. % $LiBH_4$. In some examples, "SLOBS" includes $Li_{10}Si_4S_{13}$ (50:50 $Li_2S:SiS_2$) with 0.1-10 mol. % $LiBH_4$. In some examples, "SLOBS" includes $Li_{96}Si_7S_{27}$ (65:35 $Li_2S:SiS_2$) with 0.1-10 mol. % $LiBH_4$. In some examples, "SLOBS" includes $Li_4SiS_4$ (67:33 $Li_2S:SiS_2$) with 0.1-5 mol. % $LiBH_4$. In some examples, "SLOBS" includes $Li_{14}Si_{13}S_{13}$ (70:30 $Li_2S:SiS_2$) with 0.1-5 mol. % $LiBH_4$. In some examples, "SLOBS" is characterized by the formula $(1-x)(60:40\ Li_2S:SiS_2)*(x)(Li_3BO_4)$, wherein x is from 0.01 to 0.99. As used herein, "LBS-BOX" refers to an electrolyte composition of $Li_2S:B_2S_3:LiBH_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used herein, the phrase "characterized by the formula" refers to a description of a chemical compound by its chemical formula.

As used herein, the phrase "doped with Nb, Ga, and/or Ta" means that Nb, Ga, and/or Ta is used to replace certain components of another material, for example, a garnet. A lithium-stuffed garnet that is doped with Nb, Ga, and/or Ta refers to a lithium-stuffed garnet wherein Nb, Ga, and/or Ta substitutes for an element in the lithium-stuffed garnet chemical formula, which may be, for example, Li and/or Zr.

As used herein, the term "defect" refers to an imperfection or a deviation from a pristine structure that interacts with (i.e., absorbs, scatters, reflects, refracts, and the like) light. Defects may include, but are not limited to, a pore, a grain boundary, a dislocation, a crack, a separation, a chemical inhomogeneity, or a phase segregation of two or more materials in a solid material. A perfect crystal is an example of a material that lacks defects. A nearly 100% dense oxide electrolyte that has a planar surface, with substantially no pitting, inclusions, cracks, pores, or divots on the surface, is an example of an electrolyte that is substantially lacking defects. Defects can include a second phase inclusion (e.g., a $Li_2S$ phase inside a LPSI electrolyte). Defects can include a pore inclusion. Defects can include a grain boundary wherein two adjacent grains have a region where their separation is greater than 10 nm. Defects can include pores in a porous separator.

As used herein, the term "about" when qualifying a number, e.g., about 15% w/w, refers to the number qualified and optionally the numbers included in a range about that qualified number that includes ±10% of the number. For example, about 15% w/w includes 15% w/w as well as 13.5% w/w, 14% 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "charge neutral" refers to two or more elements of a chemical compound having an ionic charge where the sum of the ionic charges is zero. For example, the phrase "wherein u, v, x, y, and z are selected so that the lithium-stuffed garnet oxide is charge neutral" refers to the summation of ionic charges equaling zero for each element the u, v, x, y, or z refers to.

As used herein, the phrase "transmission properties of the composition vary by less than 50% over a surface area of at least 100 μm²" refers to a property (e.g., transmission coefficient) which is constant, uniform, or includes the given variance over the given surface area or volume.

As used herein, the phrase "bonded to defects" refers to a composition that is fixed to a substrate having imperfections. For example, a composition bonded to defects as defined herein includes infilling, joining, or passivation of a substrate having imperfections.

As used herein the term "porous" or "porosity" refers to a material that includes pores, e.g., nanopores, mesopores, or micropores.

As used herein, the phrase "porosity as determined by SEM" refers to measurement of density by using image analysis software to analyze a scanning electron micrograph. For example, first, a user or software assigns pixels and/or regions of an image as porosity. Second, the area fraction of those regions is summed. Finally, the porosity fraction determined by SEM is equal to the area fraction of the porous region of the image.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein the phrase "electrochemical stack," refers to one or more units which each include at least a negative electrode (e.g., Li, $LiC_6$), a positive electrode (e.g., Li-nickel-manganese-oxide or $FeF_3$, optionally combined with a solid-state electrolyte or a gel electrolyte), and a solid electrolyte (e.g., an oxide electrolyte set forth herein) between and in contact with the positive and negative electrodes. In some examples, between the solid electrolyte and the positive electrode, there is an additional layer comprising a compliant (e.g., gel electrolyte). An electrochemical stack may include one of these aforementioned units. An electrochemical stack may include several of these aforementioned units arranged in electrical communication (e.g., serial or parallel electrical connection). In some examples, when the electrochemical stack includes several units, the units are layered or laminated together in a column. In some examples, when the electrochemical stack includes several units, the units are layered or laminated together in an array. In some examples, when the electrochemical stack includes several units, the stacks are arranged such that one negative electrode is shared with two or more positive electrodes. Alternatively, in some examples, when the electrochemical stack includes several units, the stacks are arranged such that one positive electrode is shared with two or more negative electrodes. Unless specified otherwise, an electrochemical stack includes one positive electrode, one solid electrolyte, and one negative electrode, and optionally includes a bonding layer between the positive electrode and the solid electrolyte.

As used here, the phrase "positive electrode," refers to the electrode in a secondary battery towards which positive ions, e.g., $Li^+$, conduct, flow, or move during discharge of the battery. As used herein, the phrase "negative electrode" refers to the electrode in a secondary battery from where positive ions, e.g., Lit flow, or move during discharge of the battery. In a battery comprised of a Li-metal electrode and a conversion chemistry, intercalation chemistry, or combination conversion/intercalation chemistry-including electrode (i.e., cathode active material; e.g., $NiF_x$, NCA, $LiNi_xMn_yCo_zO$, [NMC] or $LiNi_xAl_yCo_zO_2$ [NCA], wherein x+y+z=1), the electrode having the conversion chemistry, intercalation chemistry, or combination conversion/intercalation chemistry material is referred to as the positive electrode. In some common usages, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein, the term "surface roughness" refers to a measurement of either an arithmetic average of absolute values of sampled surface roughness amplitudes or a measurement of the maximum peak height of sampled surface roughness amplitudes. As used herein, the term, "Ra," is a measure of surface roughness wherein Ra is an arithmetic average of absolute values of sampled surface roughness amplitudes. Surface roughness measurements can be accomplished using, for example, a Keyence VK-X100 instrument that measures surface roughness using a laser. As used herein, the term, "Rt," is a measure of surface roughness wherein Rt is the maximum peak height of sampled surface roughness amplitudes.

As used herein, the term "roughened" refers to a surface that has a determined surface roughness.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein, voltage is set forth with respect to lithium (i.e., V vs. Li) metal unless stated otherwise.

As used herein, "powder mixture decomposition temperature" refers to the temperature at which the powder mixture starts to evolve hydrogen in appreciable rates so that the stoichiometry of the finished product is changed by more than 1% with respect to its stoichiometry.

General Embodiments

Referring to the Drawing, FIG. 1 shows one embodiment of an energy storage device, generally designated 10. The energy storage device includes a cathode 20, an anode 40, a solid-state ion conductor 30 positioned between the positive electrode and the anode, and current collectors 50 and 60, corresponding to a positive electrode current collector 50 and an anode current collector 60, respectively. In this embodiment, the solid-state ion conductor 30 may be an uncoated garnet configured to electrically insulate the positive electrode from the anode, while still allowing ion conduction (e.g., lithium ions) between the positive electrode and the anode during operation of energy storage device 10.

Figure 2A:
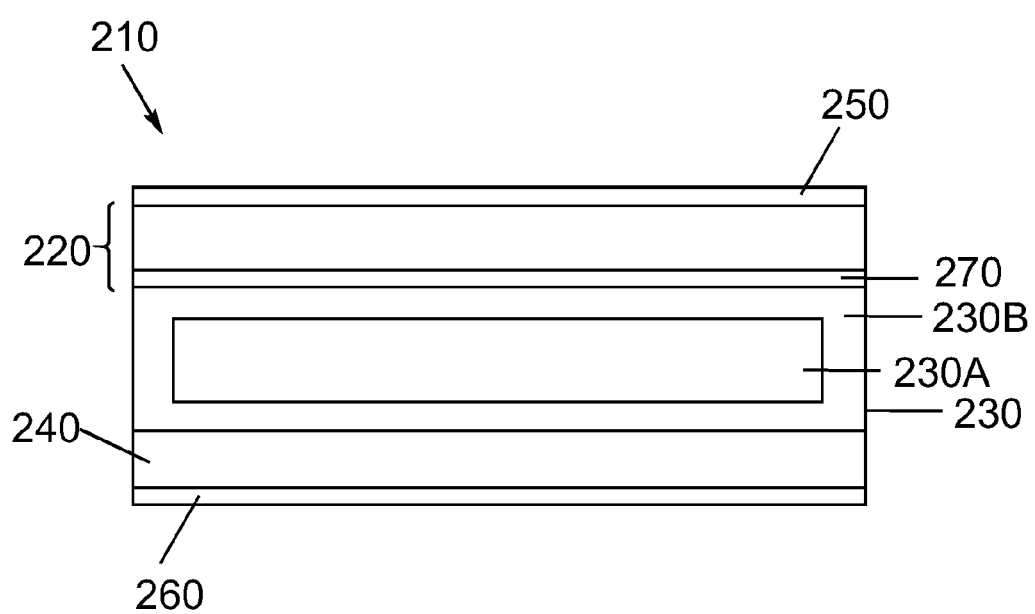
FIG. 2A shows one embodiment of an energy storage device 210 including a cathode 220, a solid-state ion conductor 230 which includes a lithium-stuffed garnet 230A and a LBHI layer 230B, an anode 240, current collectors 250 and 260, and a cathode-facing separator 270.

Now referring to FIG. 2A, shown is another embodiment of an energy storage device 210. This embodiment also includes a cathode 220, an anode 240, a solid-state conductor 230 positioned between the positive electrode and the anode, and current collectors 250 and 260 corresponding to a positive electrode current collector and an anode current collector, respectively. In this embodiment, the solid-state ion conductor 230 may be configured as a coated garnet 230A, also configured to electrically insulate the positive electrode from the anode, while still allowing ionic flow (e.g., lithium ions) between the positive electrode and the anode during operation of energy storage device 210. In this embodiment, a coating 230B may surround the coated garnet 230A. In an alternate embodiment, the coating 230B may be only or primarily on the anode-side of separator 230A. In an alternate embodiment, the coating 230B may be only or primarily on the cathode-side of separator 30A. Further, in this embodiment, cathode 220 includes a cathode-facing separator 270 positioned between coating 230B and cathode 220. For clarity purposes, cathode-facing separator 270 is depicted as a layer. In certain embodiments, however, catholyte 270 may penetrate, soak into, and/or be interspersed or infiltrate throughout cathode 220 while still being positioned between cathode 220 and coating 230B, as in FIG. 2B. For example, in FIG. 2B, catholyte 270 may remain in contact with each of the cathode 220 and the solid-state conductor 230. Interestingly, Applicants have unexpectedly observed improved performance of 210 due to the reduced degradation or decomposition of solid-state ion conductor 230 due to the presence of coating 230B. Alternatively stated, coating 230B minimizes the reactions of coated garnet 230A with the anode 240, such as those involving lithium dendrites, under typical operating conditions for energy storage device 210.

Figure 2B:
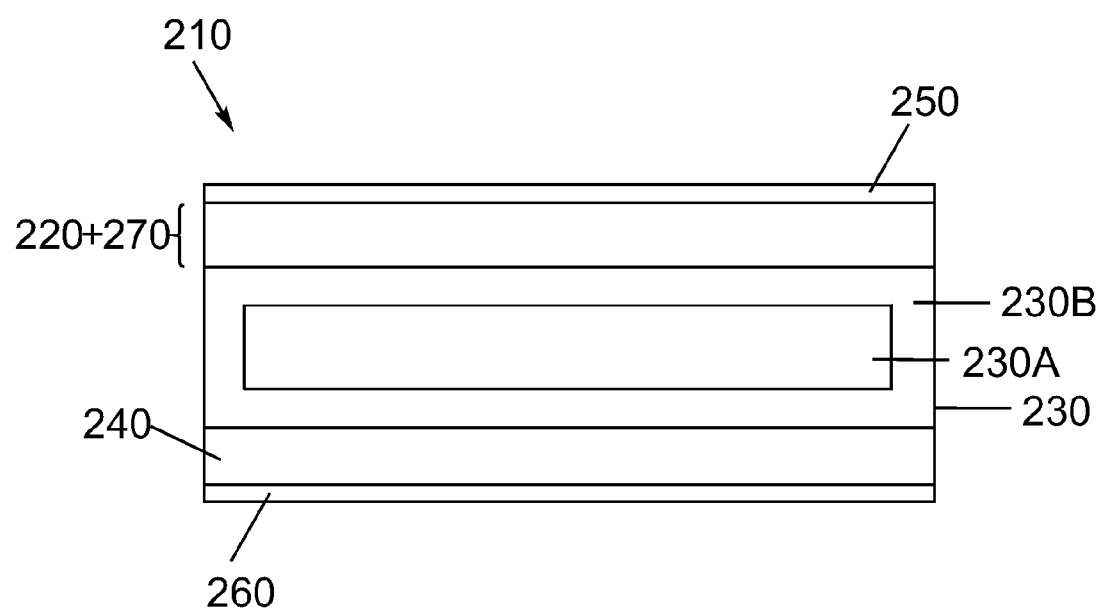
FIG. 2B shows another embodiment of an energy storage device 210 including a cathode 220, a solid-state ion conductor 230 which includes a lithium-stuffed garnet 230A and a LBHI layer 230B, an anode 240, current collectors 250 and 260, and a catholyte 270 infiltrated within cathode 220.
Figure 3:
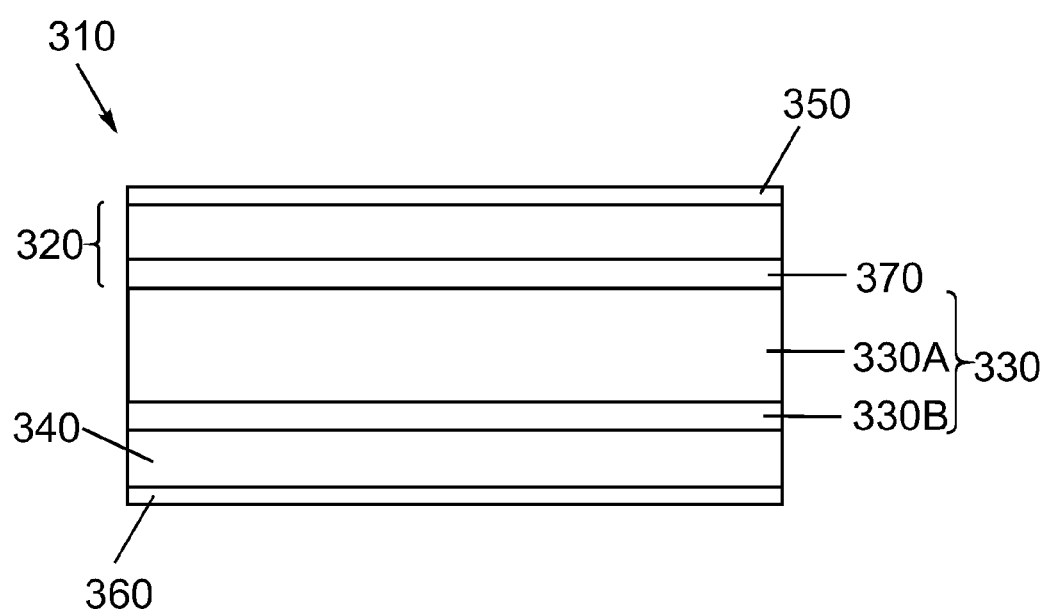
FIG. 3 shows another embodiment of an energy storage device 310 including a cathode 320, a solid-state ion conductor 330 which includes a lithium-stuffed garnet 330A and a LBHI layer 330B, an anode 340, current collectors 350 and 360, and a cathode-facing separator 370.

Referring now to FIG. 3, shown is another embodiment of an energy storage device 310. This embodiment also includes a cathode 320, an anode 340, a solid-state conductor 330 positioned between the cathode 320 and the anode 340, and current collectors 350 and 360 corresponding to a cathode current collector and an anode current collector, respectively. In this embodiment, the solid-state ion conductor 330 may be configured as a coated garnet 330A, also configured to electrically insulate the positive electrode from the anode, while still allowing ionic flow (e.g., lithium ions) between the cathode 320 and the anode 340 during operation of energy storage device 310. In this embodiment, a coating 30B may coat one portion of the coated garnet 330A. As in FIG. 2A, cathode 320 also includes a catholyte 370 positioned between solid-state conductor 330 and cathode 320. In certain embodiments similar to FIG. 2B, catholyte 370 may penetrate, soak into, and/or be interspersed or infiltrate cathode 320 while still being positioned between cathode 320 and solid-state conductor 330. In this embodiment, Applicants have also unexpectedly observed improved performance of 310 due to the reduced degradation or decomposition of 330A due to the presence of coating 330B. Alternatively stated, coating 330B minimizes reaction of coaled garnet 330A with the anode 340 under typical operating conditions for energy storage device 310.

Compositions

In certain embodiments, coating 230B, as in FIG. 2A or 2B, or 330B, as in FIG. 3, may include a composition having $A.(LiBH_4).B.(LiX).C.(LiNH_2)$ wherein X may be fluorine, bromine, chloride, iodine, or a combination thereof, and wherein $0.1 \leq A \leq 3$, $0.1 \leq B \leq 4.5$, and $0 \leq C \leq 9$. In one embodiment, X may be bromine, chlorine, iodine, or a combination thereof. In another embodiment, X may be iodine. In some embodiments, A is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0. In some embodiments, B is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5. In some embodiments, C is 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, or 9.0.

In one embodiment, the composition may be $3LiBH_4.2LiI.3LiNH_2$. In another embodiment, the composition may be $3LiBH_4.4LiI.9LiNH_2$.

In another embodiment, the composition may be $3LiBH_4.2LiCl.3LiNH_2$. In another embodiment, the composition may be $3LiBH_4.4LiCl.9LiNH_2$.

In another embodiment, the composition may be $3LiBH_4.2LiBr.3LiNF_2$. In another embodiment, the composition may be $3LiBH_4.4LiBr.9LiNH_2$.

In some embodiments, the composition may exist in different physical states. For example, in one embodiment, the composition may be amorphous. By way of further example, in one embodiment, the composition may be semi-crystalline. The composition can be made amorphous or semi-crystalline by controlling the sintering profile, e.g., by adjusting the cooling rate after sintering.

In certain embodiments, the composition may impart an ionic conductivity beneficial to the operation of the energy storage device 10, as in FIG. 1, 210, as in FIG. 2A or 2B, or 310, as in FIG. 3. In one embodiment, the composition may include a lithium ion conductivity greater than $1 \times 10^{-7}$ S/cm at 60° C. By way of further example, in one embodiment, the composition may include a lithium ion conductivity greater than $1 \times 10^{-6}$ S/cm at 60° C. By way of further example, in one embodiment, the composition may include a lithium ion conductivity greater than $1 \times 10^{-5}$ S/cm at 60° C. By way of further example, in one embodiment, the composition may include a lithium ion conductivity greater than $1 \times 10^{-4}$ S/cm at 60° C. By way of further example, in one embodiment, the total effective lithium ion conductivity is greater than 10'S/cm at 60° C. By way of further example, in one embodiment, the total effective lithium ion conductivity is greater than $8 \times 10^{-4}$ S/cm at 60° C.

In certain embodiments, the LBHI composition may include grains. Grains typically include a diameter or size and may be characterized by a median size, as defined above. For example, in one embodiment, the composition may have a $d_{90}$ grain size of less than 20 μm. By way of further example, in one embodiment, the composition may have a $d_{90}$ grain size of less than 10 μm. By way of further example, in one embodiment, the composition may have a $d_{90}$ grain size of less than 5 μm. By way of further example, in one embodiment, the composition may have a $d_{90}$ grain size of less than 2 μm. By way of further example, in one embodiment, the composition may have a $d_{90}$ grain size of less than 1 μm.

In certain embodiments, the LBHI composition may exist as a film, a single entity, or a pellet. For example, in one embodiment, the composition is a thin film. By way of further example, in one embodiment, the composition is a monolith. By way of further example, in one embodiment, the composition is a pressed pellet.

In some embodiments, the LBHI composition may further include an oxide, a sulfide, a sulfide-halide, or an electrolyte. For example, in one embodiment, the oxide may be selected from a lithium-stuffed garnet characterized by the formula $Li_xLa_yZr_zO_t.qAl_2O_3$, wherein $4<x<10$, $1<y<4$, $1<z<3$, $6<t<14$, $0 \leq q \leq 1$. By way of further example, in one embodiment, the composition includes an oxide with a coating of LBHI, where the oxide may be selected from a lithium-stuffed garnet characterized by the formula $Li_xLa_yZr_zO_t.qAl_2O_3$, wherein $4<x<10$, $1<y<4$, $1<z<3$, $6<t<14$, $0 \leq q \leq 1$. By way of further example, in one embodiment, the oxide may be selected from a lithium-stuffed garnet characterized by the formula $Li_aLa_bZr_cAl_dMe''_eO_f$, wherein $5<a<8.5$; $2<b<4$; $0<c\leq2.5$; $0\leq d<2$; $0\leq e<2$, and $10<f<13$ and Me'' is a metal selected from Nb, Ga, Ta, or combinations thereof. By way of further example, in one embodiment, the composition includes an oxide with a coating of LBHI, where the oxide may be selected from a lithium-stuffed garnet characterized by the formula $Li_aLa_bZr_cAl_dMe''_eO_f$, wherein $5<a<8.5$; $2<b<4$; $0<c\leq2.5$; $0\leq d<2$; $0\leq e<2$, and $10<f<13$ and Me'' is a metal selected from Nb, Ga, Ta, or combinations thereof. By way of further example, in one $Li_aLa_bZr_cAl_dMe''_eO_f$ embodiment as above, Me'' is Nb. By way of further example, in one $Li_aLa_bZr_cAl_dMe''_eO_f$ embodiment as above, Me'' is Ga. By way of further example, in one $Li_aLa_bZr_cAl_dMe''_eO_f$ embodiment as above, Me'' is Ta. By way of further example, in one $Li_aLa_bZr_cAl_dMe''_eO_f$ embodiment as above, Me'' is Nb and Ga. By way of further example, in one $Li_aLa_bZr_cAl_dMe''_eO_f$ embodiment as above, Me'' is Nb and Ta. By way of further example, in one $Li_aLa_bZr_cAl_dMe''_eO_f$ embodiment as above, Me'' is Ga and Ta.

By way of further example, in one embodiment, the oxide is a lithium-stuffed garnet oxide characterized by the formula $Li_uLa_vZr_xO_y \cdot zAl_2O_3$, wherein
u is a rational number from 4 to 8;
v is a rational number from 2 to 4;
x is a rational number from 1 to 3;
y is a rational number from 10 to 14; and
z is a rational number from 0.05 to 1;
wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zAl_2O_3$, wherein
u is a rational number from 4 to 8;
v is a rational number from 2 to 4;
x is a rational number from 1 to 3;
y is a rational number from 10 to 14; and
z is a rational number from 0.05 to 1;
wherein u, v, x, y, and z are selected so that the lithium-stuffed garnet oxide is charge neutral.

By way of further example, in one embodiment, the oxide is a lithium-stuffed garnet oxide characterized by the formula $Li_uLa_vZr_xO_y \cdot zTa_2O_5$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zTa_2O_5$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

By way of further example, in one embodiment, the oxide is a lithium-stuffed garnet oxide characterized by the formula $Li_uLa_vZr_xO_y \cdot zNly_2O_5$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zNb_2O_5$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

By way of further example, in one embodiment, the oxide is a lithium-stuffed garnet oxide characterized by the formula $Li_uLa_vZr_xO_y \cdot zGa_2O_3$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zGa_2O_3$, wherein
u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

By way of further example, in one embodiment, the oxide is a lithium-stuffed garnet oxide characterized by the formula $Li_uLa_vZr_xO_y \cdot zTa_2O_5 \cdot bAl_2O_3$, wherein
u is a rational number from 4 to 10;
v is a rational number from 2 to 4;
x is a rational number from 1 to 3;
y is a rational number from 10 to 14; and
z is a rational number from 0 to 1;
b is a rational number from 0 to 1;
wherein $z+b\leq1$
wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zTa_2O_5 \cdot bAl_2O_3$, wherein
u is a rational number from 4 to 10;
v is a rational number from 2 to 4;
x is a rational number from 1 to 3;
y is a rational number from 10 to 14; and
z is a rational number from 0 to 1;
b is a rational number from 0 to 1;
wherein $z+b\leq1$
wherein u, v, x, y, and z are selected so that the lithium-stuffed garnet oxide is charge neutral.

By way of further example, in one embodiment, the oxide is a lithium-stuffed garnet oxide characterized by the formula $Li_uLa_vZr_xO_y \cdot zNb_2O_5 \cdot bAl_2O_3$, wherein
u is a rational number from 4 to 10;
v is a rational number from 2 to 4;

x is a rational number from 1 to 3;
y is a rational number from 10 to 14; and
z is a rational number from 0 to 1;
b is a rational number from 0 to 1;
wherein z+b≤1
wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zNb_2O_5 \cdot bAl_2O_3$, wherein
u is a rational number from 4 to 10;
v is a rational number from 2 to 4;
x is a rational number from 1 to 3;
y is a rational number from 10 to 14; and
z is a rational number from 0 to 1;
b is a rational number from 0 to 1;
wherein z+b≤1
wherein u, v, x, y, and z are selected so that the lithium-stuffed garnet oxide is charge neutral.

By way of further example, in one embodiment, the oxide is a lithium-stuffed garnet oxide characterized by the formula $Li_uLa_vZr_xO_y \cdot zGa_2O_3 \cdot bAl_2O_3$, wherein
u is a rational number from 4 to 10;
v is a rational number from 2 to 4;
x is a rational number from 1 to 3;
y is a rational number from 10 to 14; and
z is a rational number from 0 to 1;
b is a rational number from 0 to 1;
wherein z+b≤1 and wherein u, v, x, y, and z are selected so that the lithium-stuffed garnet oxide is charge neutral.

By way of further example, in one embodiment, the composition includes an oxide with a coating of LBHI, where the oxide is a lithium-stuffed garnet oxide characterized by the formula $Li_uLa_vZr_xO_y \cdot zGa_2O_3 \cdot bAl_2O_3$, wherein
u is a rational number from 4 to 10;
v is a rational number from 2 to 4;
x is a rational number from 1 to 3;
y is a rational number from 10 to 14; and
z is a rational number from 0 to 1;
b is a rational number from 0 to 1;
wherein z+b≤1 and wherein u, v, x, y, and z are selected so that the lithium-stuffed garnet oxide is charge neutral. By way of further example, in one embodiment, the oxide is $Li_{6.4}Ga_{0.2}La_3ZrO_{12}$ where the subscripts and molar coefficients in the empirical formula are based on the quantities of raw materials initially batched to make the described $Li_{6.4}Ga_{0.2}La_3Zr_2O_{12}$.

In certain embodiments, the lithium-stuffed garnet $Li_xLa_yZr_zO_t \cdot qAl_2O_3$ may be doped with Nb, Ga, and/or Ta. By way of further example, in one embodiment, the lithium-stuffed garnet $Li_xLa_yZr_zO_t \cdot qAl_2O_3$ may be doped with Nb, Ga, and Ta. By way of further example, in one embodiment, the lithium-stuffed garnet $Li_xLa_yZr_zO_t \cdot qAl_2O_3$ may be doped with Nb, Ga, or Ta. By way of further example, in one embodiment, the lithium-stuffed garnet $LiLa_yZr_zO_t \cdot qAl_2O_3$ may be doped with Nb. By way of further example, in one embodiment, the lithium-stuffed garnet $Li_xLa_yZr_zO_t \cdot qAl_2O_3$ may be doped with Ga. By way of further example, in one embodiment, the lithium-stuffed garnet $Li_xLa_yZr_zO_t \cdot qAl_2O_3$ may be doped with Ta.

In some embodiments, the sulfide or sulfide-halide may be selected from the group consisting of LSS, SLOPS, LSTPS, SLOBS, LATS, and LPS+X, wherein X is selected from Cl, I, or Br. For example, in one embodiment, the sulfide or sulfide-halide may be LSS. By way of further example, in one embodiment, the sulfide or sulfide-halide may be SLOPS. By way of further example, in one embodiment, the sulfide or sulfide-halide may be LSTPS. By way of further example, in one embodiment, the sulfide or sulfide-halide may be SLOBS. By way of further example, in one embodiment, the sulfide or sulfide-halide may be LATS. By way of further example, in one embodiment, the sulfide or sulfide-halide may be LPS+X, wherein X is selected from Cl, I, or Br. By way of further example, the sulfide or sulfide halide may be LPS+X where LPS+X may be LPSCl. By way of further example, the sulfide or sulfide halide may be LPS+X where LPS+X may be LPSBr. By way of further example, the sulfide or sulfide halide may be LPS+X where LPS+X may be LPSI. By way of further example, the sulfide halide may be $Li_aSi_bP_cS_dX_e$, wherein 8<a<12, 1<b<3, 1<c<3, 8<d<14, and 0<X<1, wherein X is F, Cl, Br, or I. By way of further example, in one embodiment, the sulfide halide may be $Li_aSi_bP_cS_dX_e$, wherein 8<a<12, 1<b<3, 1<c<3, 8<d<14, and 0<X<1, wherein X is F. By way of further example, in one embodiment, the sulfide halide may be $Li_aSi_bP_cS_dX_e$, wherein 8<a<12, 1<b<3, 1<c<3, 8<d<14, and 0<X<1, wherein X is Cl. By way of further example, in one embodiment, the sulfide halide may be $Li_aSi_bP_cS_dX_e$, wherein 8<a<12, 1<b<3, 1<c<3, 8<d<14, and 0<X<1, wherein X is Br. By way of further example, in one embodiment, the sulfide halide may be $Li_aSi_bP_cS_dX_e$, wherein 8<a<12, 1<b<3, 1<c<3, 8<d<14, and 0<X<1, wherein X is I. By way of further example, in one embodiment, the sulfide may be $Li_aSi_bSn_cP_dS_eO_f$, wherein 2≤a≤8, 0≤b≤1, 0≤c≤1, b+c=1, 0.5≤d≤2.5, 4≤e≤12, and 0<f≤10. By way of further example, in one embodiment, the sulfide may be $Li_gAs_hSn_jS_kO_l$, wherein 2≤g≤6, 0≤h≤1, 0≤j≤1, 2≤k≤6, and 0≤l≤10. By way of further example, in one embodiment, the sulfide may be $Li_mP_nS_pX_q$, wherein X=Cl, Br, and/or I, 2≤m≤6, 0≤n≤1, 0≤p≤1, and 2≤q≤6. By way of further example, in one embodiment, the sulfide may be $Li_mP_nS_pI_q$, 2≤m≤6, 0≤n≤1, 0≤p≤1, and 2≤q≤6. By way of further example, in one embodiment, the sulfide may be a mixture of $(Li_2S):(P_2S_5)$ having a molar ratio from about 10:1 to about 6:4 and LiI, wherein the ratio of $[(Li_2S):(P_2S_5)]$:LiI is from 95:5 to 50:50. By way of further example, in one embodiment, the sulfide may be LPS+X, wherein X is selected from Cl, I, or Br. By way of further example, in one embodiment, the sulfide may be $vLi_2S+wP_2S_5+yLiX$ wherein coefficients v, w, and y are rational numbers from 0 to 1. By way of further example, in one embodiment, the sulfide may be $vLi_2S+wSiS2+yLiX$ wherein coefficients v, w, and y are rational numbers from 0 to 1. By way of further example, in one embodiment, the sulfide may be $vLi_2S+wSiS2+yLiX$ wherein coefficients v, w, and y are rational numbers from 0 to 1. By way of further example, in one embodiment, the sulfide may be $vLi_2S+wP_2S_3+yLiX$ wherein coefficients v, w, and y are rational numbers from 0 to 1. By way of further example, in one embodiment, the sulfide may be $vLi_2S+wB_2S_3+yLiX$ wherein coefficients v, w, and y are rational numbers from 0 to 1.

In some embodiments, the LBHI extends into the surface cavities of the sulfide-halide. In some embodiments, the LBHI coats the surface cavities of the sulfide-halide.

In some embodiments, the LBHI extends into the surface cavities of the lithium-stuffed garnet. In some embodiments, the LBHI coats the surface cavities of the lithium-stuffed garnet.

In some embodiments, the electrolyte may be selected from the group consisting of: a mixture of LiI and $Al_2O_3$; $Li_3N$; LIRAP; LATP; LAGP; a mixture of $LiBH_4$ and LiX wherein X is selected from Cl, I, or Br; and $vLiBH_4+wLiX+yLiNH_2$, wherein X is selected from Cl, I, or Br; wherein coefficients v, w, and y are rational numbers from 0 to 1. For example, in one embodiment, the electrolyte may be a mixture of LiI and $Al_2O_3$, $Li_3N$, LIRAP, a mixture of $LiBH_4$ and LiX wherein X is selected from Cl, I, or Br, or $vLiBH_4+wLiX+yLiNH_2$ wherein X is selected from Cl, I, or Br and wherein coefficients v, w, and y are rational numbers from 0 to 1.

In certain embodiments, the composition may include a lithium interfacial area-specific resistance. For example, in one embodiment, the lithium interfacial area-specific resistance is less than 20 $\Omega cm^2$ at 25° C.

In certain embodiments, the composition may further include a transmission coefficient at a particular incident wavelength. For example, in one embodiment, the composition has a transmission coefficient of greater than 0.05 at 500 nm incident wavelength. In another embodiment, the composition may also include transmission properties that vary by less than a percentage over a surface area of the composition. For example, in one embodiment, the composition has a transmission coefficient of greater than 0.05 at 500 nm incident wavelength and the transmission properties of the composition vary by less than 50% over a surface area of at least 100 $\mu m^2$. In another embodiment, the composition may have a transmission coefficient or greater than 0.05 at 500 nm incident wavelength and the composition is less than 1 mm thick.

Referring again to FIG. 2A, 2B, or 3, in certain embodiments, a solid-state ion conductor composition 230 or 330 may include a lithium-stuffed garnet 230A or 330A, as described elsewhere herein, and a composition 230B or 330A having $A.(LiBH_4).B.(LiX).C.(LiNH_2)$ or a lithium borohydride (LBH), as described elsewhere herein, where the LBHI coats a surface of the lithium-stuffed garnet. Typically, during the operation of an energy storage device, lithium tends to plate out unevenly, or form lithium dendrites, onto surfaces with defects. Upon lithium dendrite formation, lithium also tends to cause energy storage device failures in the form of shorting. Applicants have unexpectedly observed that LBHI coating compositions provided herein remove or fill surface defects by coating the defects, thereby extending the lifetimes for energy storage devices. For example, in one embodiment, the LBHI may be conformally bonded to the surface of the lithium-stuffed garnet. By way of further example, in one embodiment, the LBHI may be bonded to defects in the lithium-stuffed garnet.

Referring again to FIG. 2A, 2B, or 3, in certain embodiments, a solid-state ion conductor composition 230 or 330 may include a lithium-stuffed garnet 230A or 330A, as described elsewhere herein, and a composition 230B or 330A having $A.(LiBH_4).B.(LiX).C.(LiNH_2)$ or a lithium borohydride (LBH), as described elsewhere herein, where the LBHI coats a surface of the lithium-stuffed garnet. Typically, during the operation of an energy storage device, lithium tends to plate out unevenly, or form lithium dendrites, onto surfaces with defects. Upon lithium dendrite formation, lithium also tends to cause energy storage device failures in the form of shorting. Applicants have unexpectedly observed that coating comprising $A.(LiBH_4).B.(LiX).C.(LiNH_2)$ wherein X is fluorine (F), bromine (Br), chloride (Cl), iodine (I), or a combination thereof, and wherein $0.1 \leq A \leq 4$, $0.1 \leq B \leq 4$, and $0 < C \leq 9$, provided herein remove or fill surface defects by coating the defects, thereby extending the lifetimes for energy storage devices. For example, in one embodiment, the LBHI may be conformally bonded to the surface of the lithium-stuffed garnet. By way of further example, in one embodiment, the LBHI may be bonded to defects in the lithium-stuffed garnet.

In some examples, including any of the foregoing, the composition includes $A.(LiBH_4).B.(LiX).C.(LiNH_2)$ wherein X may be fluorine, bromine, chloride, iodine, or a combination thereof, and wherein $0.1 \leq A \leq 4.5$, $0.1 \leq B \leq 4.5$, and $0 < C \leq 9$. In one embodiment, X may be bromine, chlorine, iodine, or a combination thereof. In another embodiment, X may be iodine. In some embodiments, A is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5. In some embodiments, B is 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, or 4.5. In some embodiments, C is 0.0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, or 9.0. In some examples, including any of the foregoing, the composition includes a lithium-stuffed garnet. In some examples, including any of the foregoing, the composition is a thin film. In some examples, including any of the foregoing, the composition is a pellet.

Composition Dimensions

In some embodiments, the LBHI composition may be a film (e.g., on a current collector such as copper metal or on an electrolyte such as lithium-stuffed garnet monoliths or thin films). For example, in one embodiment, the composition may be a thin film. In certain embodiments, the thin films set forth herein have a thickness greater than 10 nm and less than 30 $\mu m$. For example, in one embodiment, the thin films are less than 20 $\mu m$ in thickness. By way of further example, in one embodiment, the thin films are less than 19 $\mu m$ in thickness. By way of further example, in one embodiment, the thin films are less than 18 $\mu m$ in thickness. By way of further example, in one embodiment, the thin films are less than 17 $\mu m$ in thickness. By way of further example, in one embodiment, the thin films are less than 16 $\mu m$ in thickness. By way of further example, in one embodiment, the thin films are less than 15 $\mu m$ in thickness. By way of further example, in one embodiment, the thin films are less than 14 $\mu m$ in thickness. By way of further example, in one embodiment, the thin films are less than 13 $\mu m$ in thickness. By way of further example, in one embodiment, the thin films are less than 12 $\mu m$ in thickness. By way of further example, in one embodiment, the thin films are less than 11 $\mu m$ in thickness. By way of further example, in one embodiment, the thin films are less than 10 $\mu m$ in thickness. By way of further example, in one embodiment, the thin films are less than 9 $\mu m$ in thickness. By way of further example, in one embodiment, the thin films are less than 8 $\mu m$ in thickness. By way of further example, in one embodiment, the thin films are less than 7 $\mu m$ in thickness. By way of further example, in one embodiment, the thin films are less than 6 $\mu m$ in thickness. By way of further example, in one embodiment, the thin films are less than 5 $\mu m$ in thickness. By way of further example, in one embodiment, the thin films are less than 4 $\mu m$ in thickness. By way of further example, in one embodiment, the thin films are less than 3 $\mu m$ in thickness. By way of further example, in one embodiment, the thin films are less than 2 $\mu m$ in thickness. By way of further example, in one embodiment, the thin films are less than 1 $\mu m$ in thickness. By way of further example, in one embodiment, the thin films are at least 1 nm in thickness.

In some embodiments, the composition comprising A.(LiBH$_4$).B.(LiX).C.(LiNH$_2$) wherein X is fluorine (F), bromine (Br), chloride (Cl), iodine (I), or a combination thereof, and wherein 0.1≤A≤4, 0.1≤B≤−4, and 0≤C≤9 may be a film (e.g., on a current collector such as copper metal or on an electrolyte such as lithium-stuffed garnet monoliths or thin films). For example, in one embodiment, the composition may be a thin film. In certain embodiments, the thin films set forth herein have a thickness greater than 10 nm and less than 30 μm. For example, in one embodiment, the thin films are less than 20 μm in thickness. By way of further example, in one embodiment, the thin films are less than 19 μm in thickness. By way of further example, in one embodiment, the thin films are less than 18 μm in thickness. By way of further example, in one embodiment, the thin films are less than 17 μm in thickness. By way of further example, in one embodiment, the thin films are less than 16 μm in thickness. By way of further example, in one embodiment, the thin films are less than 15 μm in thickness. By way of further example, in one embodiment, the thin films are less than 14 μm in thickness. By way of further example, in one embodiment, the thin films are less than 13 μm in thickness. By way of further example, in one embodiment, the thin films are less than 12 μm in thickness. By way of further example, in one embodiment, the thin films are less than 11 μm in thickness. By way of further example, in one embodiment, the thin films are less than 10 μm in thickness. By way of further example, in one embodiment, the thin films are less than 9 μm in thickness. By way of further example, in one embodiment, the thin films are less than 8 μm in thickness. By way of further example, in one embodiment, the thin films are less than 7 μm in thickness. By way of further example, in one embodiment, the thin films are less than 6 μm in thickness. By way of further example, in one embodiment, the thin films are less than 5 μm in thickness. By way of further example, in one embodiment, the thin films are less than 4 μm in thickness. By way of further example, in one embodiment, the thin films are less than 3 μm in thickness. By way of further example, in one embodiment, the thin films are less than 2 μm in thickness. By way of further example, in one embodiment, the thin films are less than 1 μm in thickness. By way of further example, in one embodiment, the thin films are at least 1 nm in thickness.

In some of these examples, including any of the foregoing, the films are 1 mm in length. In some other of these examples, the films are 5 mm in length. In yet other examples, the films are 10 mm in length. In still other examples, the films are 15 mm in length. In certain examples, the films are 25 mm in length. In other examples, the films are 30 mm in length. In some examples, the films are 35 mm in length. In some other examples, the films are 40 mm in length. In still other examples, the films are 45 mm in length. In certain examples, the films are 50 mm in length. In other examples, the films are 30 mm in length. In some examples, the films are 55 mm in length. In some other examples, the films are 60 mm in length. In yet other examples, the films are 65 mm in length. In still other examples, the films are 70 mm in length. In certain examples, the films are 75 mm in length. In other examples, the films are 80 mm in length. In some examples, the films are 85 mm in length. In some other examples, the films are 90 mm in length. In still other examples, the films are 95 mm in length. In certain examples, the films are 100 mm in length. In other examples, the films are 30 mm in length.

In some examples, the films are 1 cm in length. In some other examples, the films are 2 cm in length. In other examples, the films are 3 cm in length. In yet other examples, the films are 4 cm in length. In some examples, the films are 5 cm in length. In other examples, the films are 6 cm in length. In yet other examples, the films are 7 cm in length. In some other examples, the films are 8 cm in length. In yet other examples, the films are 9 cm in length. In still other examples, the films are 10 cm in length. In some examples, the films are 11 cm in length. In some other examples, the films are 12 cm in length. In other examples, the films are 13 cm in length. In yet other examples, the films are 14 cm in length. In some examples, the films are 15 cm in length. In other examples, the films are 16 cm in length. In yet other examples, the films are 17 cm in length. In some other examples, the films are 18 cm in length. In yet other examples, the films are 19 cm in length. In still other examples, the films are 20 cm in length. In some examples, the films are 21 cm in length. In some other examples, the films are 22 cm in length. In other examples, the films are 23 cm in length. In yet other examples, the films are 24 cm in length. In some examples, the films are 25 cm in length. In other examples, the films are 26 cm in length. In yet other examples, the films are 27 cm in length. In some other examples, the films are 28 cm in length. In yet other examples, the films are 29 cm in length. In still other examples, the films are 30 cm in length. In some examples, the films are 31 cm in length. In some other examples, the films are 32 cm in length. In other examples, the films are 33 cm in length. In yet other examples, the films are 34 cm in length. In some examples, the films are 35 cm in length. In other examples, the films are 36 cm in length. In yet other examples, the films are 37 cm in length. In some other examples, the films are 38 cm in length. In yet other examples, the films are 39 cm in length. In still other examples, the films are 40 cm in length. In some examples, the films are 41 cm in length. In some other examples, the films are 42 cm in length. In other examples, the films are 43 cm in length. In yet other examples, the films are 44 cm in length. In some examples, the films are 45 cm in length. In other examples, the films are 46 cm in length. In yet other examples, the films are 47 cm in length. In some other examples, the films are 48 cm in length. In yet other examples, the films are 49 cm in length. In still other examples, the films are 50 cm in length. In some examples, the films are 51 cm in length. In some other examples, the films are 52 cm in length. In other examples, the films are 53 cm in length. In yet other examples, the films are 54 cm in length. In some examples, the films are 55 cm in length. In other examples, the films are 56 cm in length. In yet other examples, the films are 57 cm in length. In some other examples, the films are 58 cm in length. In yet other examples, the films are 59 cm in length. In still other examples, the films are 60 cm in length. In some examples, the films are 61 cm in length. In some other examples, the films are 62 cm in length. In other examples, the films are 63 cm in length. In yet other examples, the films are 64 cm in length. In some examples, the films are 65 cm in length. In other examples, the films are 66 cm in length. In yet other examples, the films are 67 cm in length. In some other examples, the films are 68 cm in length. In yet other examples, the films are 69 cm in length. In still other examples, the films are 70 cm in length. In some examples, the films are 71 cm in length. In some other examples, the films are 72 cm in length. In other examples, the films are 73 cm in length. In yet other examples, the films are 74 cm in length. In some examples, the films are 75 cm in length. In other examples, the films are 76 cm in length. In yet other examples, the films are 77 cm in length. In some other examples, the films are 78 cm in length. In yet other examples, the films are 79 cm in length. In still other examples, the films are 80 cm in length. In some examples, the films are 81 cm in length. In some other examples, the films are 82 cm in length. In other examples, the films are 83 cm in length. In yet other examples, the films are 84 cm in length. In some examples, the films are 85 cm in length. In other examples, the films are 86 cm in length. In yet other examples, the films are 87 cm in length. In some other examples, the films are 88 cm in length. In yet other examples, the films are 89 cm in length. In still other examples, the films are 90 cm in length. In some examples, the films are 91 cm in length. In some other examples, the films are 92 cm in length. In other examples, the films are 93 cm in length. In yet other examples, the films are 94 cm in length. In some examples, the films are 95 cm in length. In other examples, the films are 96 cm in length. In yet other examples, the films are 97 cm in length. In some other examples, the films are 98 cm in length. In yet other examples, the films are 99 cm in length. In still other examples, the films are 100 cm in length. In some examples, the films are 101 cm in length. In some other examples, the films are 102 cm in length. In other examples, the films are 103 cm in length. In yet other examples, the films are 104 cm in length. In some examples, the films are 105 cm in length. In other examples, the films are 106 cm in length. In yet other examples, the films are 107 cm in length. In some other examples, the films are 108 cm in length. In yet other examples, the films are 109 cm in length. In still other examples, the films are 110 cm in length. In some examples, the films are 111 cm in length. In some other examples, the films are 112 cm in length. In other examples, the films are 113 cm in length. In yet other examples, the films are 114 cm in length. In some examples, the films are 115 cm in length. In other examples, the films are 116 cm in length. In yet other examples, the films are 117 cm in length. In some other examples, the films are 118 cm in length. In yet other examples, the films are 119 cm in length. In still other examples, the films are 120 cm in length.

In some examples, the garnet-based films are prepared as a monolith useful for a lithium secondary battery cell. In some of these cells, the form factor for the garnet-based film is a film with a top surface area of about 10 cm$^2$. In certain cells, the form factor for the garnet-based film with a top surface area of about 25 cm$^2$. In certain cells, the form factor for the garnet-based film with a top surface area of about 100 cm$^2$. In certain cells, the form factor for the garnet-based film with a top surface area of about 200 cm$^2$.

In some examples, the films set forth herein have a Young's Modulus of about 130-150 GPa. In some other examples, the films set forth herein have a Vicker's hardness of about 5-7 GPa. In some other examples, the films set forth herein have a fracture strength of greater than 300 MPa or greater than 400 MPa or greater than 500 MPa, or greater than 600 MPa, or greater than 700 MPa, or greater than 800 MPa, or greater than 900 MPa, or greater than 1 GPa. In some of these examples, the films include a lithium-stuffed garnet. In some of these examples, the films include a lithium-stuffed garnet coated with LBHI.

In certain embodiments, the composition may be a thin film and include a porosity as determined by SEM for the thin film. For example, in one embodiment, the compositions set forth herein may have a porosity less than 5%. By way of further example, in one embodiment, the compositions set forth herein may have a porosity less than 6%. By way of further example, in one embodiment, the compositions set forth herein may have a porosity less than 7%. By way of further example, in one embodiment, the compositions set forth herein may have a porosity less than 8%. By way of further example, in one embodiment, the compositions set forth herein may have a porosity less than 4%. By way of further example, in one embodiment, the compositions set forth herein may have a porosity less than 3%. By way of further example, in one embodiment, the compositions set forth herein may have a porosity less than 2%. By way of further example, in one embodiment, the compositions set forth herein may have a porosity less than 1%. By way of further example, in one embodiment, the compositions set forth herein may have a porosity less than 0.5%.

In certain embodiments, the composition may be a thin film and include a porosity as determined by SEM for the thin film. For example, in one embodiment, the compositions set forth herein may have a porosity less than 5% by volume. By way of further example, in one embodiment, the compositions set forth herein may have a porosity less than 6% by volume. By way of further example, in one embodiment, the compositions set forth herein may have a porosity less than 7% by volume. By way of further example, in one embodiment, the compositions set forth herein may have a porosity less than 8% by volume. By way of further example, in one embodiment, the compositions set forth herein may have a porosity less than 4% by volume. By way of further example, in one embodiment, the compositions set forth herein may have a porosity less than 3% by volume. By way of further example, in one embodiment, the compositions set forth herein may have a porosity less than 2% by volume. By way of further example, in one embodiment, the compositions set forth herein may have a porosity less than 1% by volume. By way of further example, in one embodiment, the compositions set forth herein may have a porosity less than 0.5% by volume.

In certain embodiments, substrates having thin films deposited thereon may be prepared via dip coating. Applicants have unexpectedly noted that dip coating the substrate to express thin films improves the surface of the substrate. For example, in one embodiment, the surface of the substrate may have a smooth surface. Dip coatings may include a plurality of dips. For example, in one embodiment, a substrate may be dip coated 1 time. By way of further example, a substrate may be dip coated 2 times. By way of further example, a substrate may be dip coated 5 times. By way of further example, a substrate may be dip coated 10 times. By way of further example, a substrate may be dip coated 20 times.

Dip coating typically includes a withdrawal rate that affects the thickness of the coating. In certain embodiments the withdrawal rate may include a range of 0.01 to 0.25 mm/min. For example, in one embodiment, the withdrawal rate is 0.05 mm/min. By way of further example, in one embodiment, the withdrawal rate is 0.1 mill/min. By way of further example, in one embodiment, the withdrawal rate is 0.15 mm/min. By way of further example, in one embodiment, the withdrawal rate is 0.2 min/min. By way of further example, in one embodiment, the withdrawal rate is 0.25 mm/min. Withdrawal rate may be determined, for example, by measuring the distance of a substrate out of a molt per time.

In certain embodiments, the thin film coating thickness may be governed by the Landau-Levich equation shown below:

$$h = \frac{0.94(\eta U)^{2/3}}{\gamma_{LV}^{1/6}(\rho g)^{1/2}}$$

where h is the coating thickness, $\eta$ is the viscosity, U is withdrawal rate or wall speed, $\gamma_{LV}$ is the liquid-vapor surface tension, $\rho$ is the density, and g is gravity. Coating thickness is largely determined by the withdrawal rate, solid content, and viscosity of the liquid. In certain embodiments, the thin film coating may not be governed by the Landau-Levich equation. For example, in one embodiment, a withdrawal rate of about 0.1 turn/min provides a film thickness of about 70 μm. By way of further example, in one embodiment, a withdrawal rate of <0.1 mm/min provides a film thickness of about 1 μm to about 10 μm. By way of further example, in one embodiment, a withdrawal rate of <0.1 mm/min and a retention time of about 5 min to about 10 min provides a film thickness of about 1 μm to about 10 μm.

In certain embodiments, the combination of multiple dips via dip coating produces a smooth film. For example, in one embodiment, 2-5 dips may be used. By way of further example, in one embodiment, 5-15 dips may be used. By way of further example, in one embodiment, 2-20 dips may be used. By way of further example, in one embodiment, 10-30 dips may be used.

For example, in one embodiment, dip coating at >4 mm/sec provides a smooth film. By way of further example, in one embodiment, dip coating at >4 mm/sec with a thermal equilibration time of about 5 s to about 20 s provides a smooth film. By way of further example, in one embodiment, dip coating at >4 mm/sec with a thermal equilibration time of about 5 s to about 20 s and dip cycling about 10 to about 30 times provides a smooth film. By way of further example, in one embodiment, dip coating at >4 mm/sec with a thermal equilibration time of about 5 s to about 20 s with dip cycling about 10 to about 30 times and a total retention time of about 200 s provides a smooth film. By way of further example, in one embodiment, dip coating at >4 mm/sec with a thermal equilibration time of about 5 s to about 20 s at 330-384° C. with dip cycling about 10 to about 30 times and a total retention time of about 6.7 min provides a smooth film.

In certain embodiments, the molten LBHXN is applied via spin coating. A spin coater with heating capability is used for this embodiment. Powder is first applied on the substrate to be coated. The spin coater is heated to or above the melting point of the LBHXN. After melting, the substrate is rotated at speed of 100-5000 rpm while heat is applied. It is to be understood that the spin speed may correlate strongly with the coating film thickness. After rotation stops, the $2^{nd}$ layer, which could be a solid-state cathode film, or another lithium ion conducting separator (which is the same or a different Li ion conductor than the first substrate) is laminated at a pressure of 10-2000 pounds per square inch (PSI). Heat is optionally applied. After cooling the laminate to room temperature, the substrate, LBHXN and top layer are bonded together very well and cannot be separated without breaking.

Energy Storage Devices

In some embodiments, the disclosure herein sets forth energy storage devices 10 including electrochemical cells, as described elsewhere herein. For example, in one embodiment, an electrochemical cell includes a positive electrode, a negative electrode and a solid-state electrolyte having the composition as described any of the foregoing examples or embodiments, or any others set forth herein. By way of further example, in one embodiment, the electrochemical cell is a rechargeable battery.

Battery Architectures

Referring again to FIG. 3, shown is another embodiment of an energy storage device or electrochemical cell 310. This embodiment also includes a positive electrode or cathode 320, an anode or lithium metal negative electrode 340, a solid-state conductor or solid separator 330 positioned between the cathode 320 and the anode 340, and current collectors 350 and 360 corresponding to a cathode current collector and an anode current collector, respectively. In this embodiment, the solid separator 330 may be configured as a coated garnet 330A, also including a cathode directly contacting the separator and an anode directly contacting the separator further configured to electrically insulate the cathode from the anode, while still allowing ionic flow (e.g., lithium ions) between the cathode 320 and the anode 340 during operation of energy storage device 310. In this embodiment, the anode directly contacts the separator 330, where coating 330B may coat one portion of the solid separator 330. Again, as in FIG. 2, cathode 220 also includes a catholyte 270 positioned between solid separator 230 and cathode 220. In certain embodiments, catholyte 270 may penetrate cathode 220 while still being positioned between cathode 220 and solid separator 230, as in FIG. 2A. Further, in this embodiment, the anode directly contacting the separator 230B includes the composition(s) as described elsewhere herein. In another embodiment, the anode directly contacting the separator 230B may be less than 20 μm thick.

In another embodiment, the solid separator 230 may be configured as a coated garnet 230A, also including a cathode-interfacing separator and/or an anode-interfacing separator further configured to electrically insulate the cathode from the anode, while still allowing ionic flow (e.g., lithium ions) between the cathode 220 and the anode 240 during operation of energy storage device 210. For example, in certain embodiments, the cathode-interfacing separator may not directly contact the separator. By way of further example, in certain embodiments, the anode-interfacing separator may not directly contact the separator.

Methods of Making the Materials Described Herein

In certain embodiments, disclosed herein is a method for making a thin film including the A.(LiBH$_4$).B.(LiX).C.(LiNH$_2$) composition, the method including a) preparing a A.(LiBH$_4$).B.(LiX).C.(LiNH$_2$) composition material, b) providing a molten mixture, wherein the mixture includes A.(LiBH$_4$).B.(LiX).C.(LiNH$_2$), wherein X is fluorine, bromine, chlorine, iodine, or a combination thereof, and wherein 0.1≤A≤3; 0.1≤B≤4, and 0≤C≤9; c) dip-coating a substrate in the molten mixture; d) withdrawing the substrate; and e) cooling the substrate to room temperature. In some examples, the substrate is a current collector. In some examples, the substrate is a solid electrolyte. In some examples, the substrate is a lithium-stuffed garnet.

In certain embodiments, the thin films of LBHI set forth from the method herein have a thickness greater than 10 nm and less than 30 μm. For example, in one embodiment, the thin films set forth from the method are less than 20 μm in thickness. By way of further example, in one embodiment, the thin films set forth from the method are less than 19 μm in thickness. By way of further example, in one embodiment, the thin films set forth from the method are less than 18 μm in thickness. By way of further example, in one embodiment, the thin films set forth from the method are less than 17 μm in thickness. By way of further example, in one embodiment, the thin films set forth from the method are less than 16 μm in thickness. By way of further example, in one embodiment, the thin films set forth from the method are less than 15 μm in thickness. By way of further example, in one embodiment, the thin films set forth from the method are less than 14 μm in thickness. By way of further example, in one embodiment, the thin films set forth from the method are less than 13 µm in thickness. By way of further example, in one embodiment, the thin films set forth from the method are less than 12 µm in thickness. By way of further example, in one embodiment, the thin films set forth from the method are less than 11 µm in thickness. By way of further example, in one embodiment, the thin films set forth from the method are less than 10 µm in thickness. By way of further example, in one embodiment, the thin films set forth from the method are less than 9 µm in thickness. By way of further example, in one embodiment, the thin films set forth from the method are less than 8 µm in thickness. By way of further example, in one embodiment, the thin films set forth from the method are less than 7 µm in thickness. By way of further example, in one embodiment, the thin films set forth from the method are less than 6 µm in thickness. By way of further example, in one embodiment, the thin films set forth from the method are less than 5 µm in thickness. By way of further example, in one embodiment, the thin films set forth from the method are less than 4 µm in thickness. By way of further example, in one embodiment, the thin films set forth from the method are less than 3 µm in thickness. By way of further example, in one embodiment, the thin films set forth from the method are less than 2 µm in thickness. By way of further example, in one embodiment, the thin films set forth from the method are less than 1 µm in thickness. In certain embodiments, the LBHI material may penetrate pores of the separator and may not be itself distinguishable as a separate layer.

In certain embodiments, the method may impart an ionic conductivity beneficial to the operation of the energy storage device 10, 210, or 310. For example, ionic conductivity may be for ions such as lithium. By way of further example, in one embodiment, the method may impart a lithium ion conductivity greater than $1 \times 10^{-7}$ S/cm at 60° C. By way of further example, in one embodiment, the method may impart a lithium ion conductivity greater than $1 \times 10^{-6}$ S/cm at 60° C. By way of further example, in one embodiment, the method may impart a lithium ion conductivity greater than $1 \times 10^{-5}$ S; cm at 60° C. By way of further example, in one embodiment, the method may impart a lithium ion conductivity greater than $1 \times 10^{-4}$ S/cm at 60° C. By way of further example, in one embodiment, the method may impart a lithium ion conductivity greater than $8 \times 10^{-4}$ S/cm at 60° C. Ion conductivity may be determined, for example, indirectly from the impedance in ASR measurements described elsewhere herein.

In certain embodiments, the substrate in the method may be a solid separator-electrolyte for a lithium battery. For example, in one embodiment, the substrate in the method may be a solid separator-electrolyte garnet for a lithium battery. By way of further example, in one embodiment, the substrate in the method may be a metal selected from the group consisting of copper and nickel. By way of further example, in one embodiment, the substrate in the method may be copper. By way of further example, in one embodiment, the substrate in the method may be nickel. By way of further example, in one embodiment, the substrate in the method may be a foil. By way of further example, in one embodiment, the substrate in the method may be a LPSI. By way of further example, in one embodiment, the substrate in the method may be a LPSI composite.

In certain embodiments, provided herein is a composite having a lithium-stuffed garnet and an LBHI, where the LBHI fills at least 90% of the through-pores and/or surface pores of the lithium-stuffed garnet, and where the LBHI may be a composition having $A.(LiBH_4).B.(LiX).C.(LiNH_2)$ wherein X is a halide. In certain embodiments, provided herein is a composite having a lithium-stuffed garnet and an LBHI, where the LBHI fills at least 95% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 < C \leq 9$.

In certain embodiments, provided herein is a composite having a lithium-stuffed garnet and an LBHI, where the LBHI fills at least 95% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 90% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 91% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 92% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 93% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 94% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq -4$, $0.1 \leq B \leq -4$, and $0 \leq C \leq 9$.

In certain embodiments, provided herein is a composite having a lithium-stuffed garnet and an LBHI, where the LBHI fills at least 95% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 96% of the through-pores and/or surface pores of the lithium-stuffed garnet, and where the LBHI may be a composition having $A(LiBH_4).B.(LiX).C.(LiNH_2)$ wherein X is a halide wherein $0.1 \leq A \leq 4$, $0.1 \leq B \leq 4$, and $0 \leq C \leq 9$.

In certain embodiments, provided herein is a composite having a lithium-stuffed garnet and an LBHI, where the LBHI fills at least 97% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 \leq B \leq 4L$ and $0 \leq C \leq 9$.

In certain embodiments, provided herein is a composite having a lithium-stuffed garnet and an LBHI, where the LBHI fills at least 98% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq -4$, $0.1 \leq B \leq -4$, and $0 \leq C \leq 9$.

In certain embodiments, provided herein is a composite having a lithium-stuffed garnet and an LBHI, where the LBHI fills at least 99% of the through-pores and/or surface pores of the lithium-stuffed garnet, and where the LBHI may be a composition having $A.(LiBH_4).B.(LiX).C.(LiNH_2)$ wherein X is a halide wherein $0.1 \leq A \leq 4$, $0.1 < < B < 4$, and $0 < C \leq 9$.

In certain embodiments, provided herein is a composition having an LBHI coating on a roughened lithium-stuffed garnet where the LBHI may be a composition having $A.(LiBH_4).B.(LiX).C.(LiNH_2)$ wherein X is a halide wherein $0.1 \leq A \leq 4$, $0.1 \leq B \leq 4$, and $0 < C \leq 9$.

In certain embodiments, provided herein is a composition having an LBHI on a curved lithium-stuffed garnet where the LBHI may be a composition having $A.(LiBH_4).B.(LiX).C.(LiNH_2)$ wherein X is a halide wherein $0.1 \leq A \leq -4$, $0.1 \leq B \leq 4$, and $0 \leq C \leq 9$.

In certain embodiments, provided herein is a composition having an LBHI coating on a corrugated lithium-stuffed garnet where the LBHI may be a composition having $A.(LiBH_4).B.(LiX).C.(LiNH_2)$ wherein X is a halide wherein $0.1 \leq A \leq 4$, $0.1 \leq B \leq 4$, and $0 < C \leq 9$.

In certain embodiments, provided herein is a composition having an LBHI interdigitated within a lithium-stuffed garnet where the LBHI may be a composition having $A.(LiBH_4).B.(LiX).C.(LiNH_2)$ wherein X is a halide wherein $0.1 \leq A \leq 4$, $0.1 \leq B \leq 4L$ and $0 < C \leq 9$.

In certain embodiments, provided herein is a method for coating a lithium ion conducting separator electrolyte, the method including: a) providing the separator electrolyte; and b) pressing a composition of $A.(LiBH_4).B.(LiX).C.(LiNH_2)$, where X may be fluorine, bromine, chlorine, iodine, or a combination thereof, and wherein $0.1 \leq A \leq 3$, $0.1 \leq B \leq 4$, and $0 < C \leq 9$ at a temperature between 100-280° C. at a pressure of 10-2000 PSI on at least one surface of the separator. For example, in one embodiment, the method for coating a lithium ion conducting separator electrolyte includes a) providing the separator electrolyte; and b) pressing a composition of $A.(LiBH_4).B.(LiX).C.(LiNH_2)$, where X is fluorine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A(LiBH_4).B.(LiX).C.(LiNH_2)$, where X is bromine; and wherein $0.1 \leq A \leq 3$, $0.1 \leq B \leq 4$, and $0 < C \leq 9$ at a temperature between 100-280° C. at a pressure of 10-2000 PST on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is chlorine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is iodine, and wherein $0.1 < \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is fluorine, bromine, and chlorine, and wherein $0.1 \leq A \leq 3$, $0.1 \leq B \leq 4$, and $0 \leq C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is fluorine, bromine, and iodine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is fluorine, chlorine, and iodine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is bromine, chlorine, and iodine, and wherein $0.1 \leq A \leq 3$, $0.1 \leq B \leq 4$, and $0 < C \leq 9$ at a temperature between 100-280° C. at a pressure of 10-2000 PSI on at least one surface of the separator.

In certain embodiments, provided herein is a method for coating a lithium ion conducting separator electrolyte, the method including: a) providing the separator electrolyte; and b) pressing a composition of $A(LiBH_4).B.(LiX).C.(LiNH_2)$, where X may be fluorine, bromine, chlorine, iodine, or a combination thereof, and wherein $0.1 \leq A \leq 3$, $0.1 \leq B \leq 4$, and $0 < C \leq 9$ at a temperature between 100-280° C. at a pressure of 10-2000 PST on at least one surface of the separator. For example, in one embodiment, the method for coating a lithium ion conducting separator electrolyte includes a) providing the separator electrolyte; and b) pressing a composition of $A.(LiBH_4).B.(LiX).C.(LiNH_2)$, where X is fluorine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A(LiBH_4).B.(LiX).C.(LiNH_2)$, where X is bromine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of $A.(LiBH_4).B.(LiX).C.(LiNH_2)$, where X is chlorine, and wherein $0.1 \leq A \leq 3$, $0.1 \leq B \leq 4$, and $0 < C \leq 9$ at a temperature between 100-280° C. at a pressure of 10-2000 PSI on at least one surface of the separator. By way of further example, in one embodiment, the method for coating a lithium ion conducting separator electrolyte includes a)

providing the separator electrolyte; and b) pressing a composition of A.(LiBH$_4$).B.(LiX).C.(LiNH$_2$), where X is iodine, and wherein 0.1≤A≤3, 0.1≤B≤4, and 0<C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A.(LiBH$_4$).B.(LiX).C.(LiNH$_2$), where X is fluorine, bromine, and chlorine, and wherein 0.1≤A≤3, 0.1≤B≤4, and 0<C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A.(LiBH$_4$).B.LiX).C.(LiNH$_2$), where X is fluorine, bromine, or iodine, and wherein 0.1≤A≤3, 0.1≤B≤4, and 0<C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A.(LiBH$_4$).B.(LiX).C.(LiNH$_2$), where X is fluorine, chlorine, or iodine, and wherein 0.1≤A≤3, 0.1≤B≤-4, and 0<C≤9 at a temperature between 100-280° C. at a pressure of 10-2000 PSI on at least one surface of the separator. By way of further example, in one embodiment, the method for coating a lithium ion conducting separator electrolyte includes a) providing the separator electrolyte; and b) pressing a composition of A.(LiBH$_4$).B.(LiX).C.(LiNH$_2$), where X is bromine, chlorine, or iodine, and wherein 0.1≤A≤3, 0.1≤B≤4, and 0<C≤9 at a temperature between 100-280° C. at a pressure of 10-2000 PSI on at least one surface of the separator.

In certain embodiments, the temperature in the method is below the melting point (Li) of the separator, and is about 0.8 $T_R$, where Tin is expressed in Kelvin (K).

In certain embodiments, the method further includes c) holding the pressure between the composition and the separator for 1-300 min.

In certain embodiments, the method further includes d) cooling the coated lithium ion conducting separator electrolyte under pressure for 10-1000 min.

In certain embodiments, the method further includes d) cooling the coated lithium ion conducting separator electrolyte under pressure for 10-1000 min to room temperature.

In certain embodiments, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by spray coating, spin coating, dip coating, slot die coating, gravure coating, or microgravure coating. For example, in one embodiment, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by spray coating. By way of further example, in one embodiment, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by spin coating. By way of further example, in one embodiment, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by dip coating. By way of further example, in one embodiment, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by slot die coating. By way of further example, in one embodiment, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by gravure coating. By way of further example, in one embodiment, provided is a method for coating a lithium ion conducting separator electrolyte, the method including a) providing a lithium-stable separator electrolyte; b) providing a mixture of a solvent and an A.(LiBH$_4$).B.(LiX).C.(LiNH$_2$) precursor; and c) depositing the mixture on the separator by microgravure coating.

In certain embodiments, the solvent in the method is selected from the group consisting of tetrahydrofuran, diethyl ether, methanol, and ethanol. For example, in one embodiment, the solvent in the method is tetrahydrofuran. By way of further example, in one embodiment, the solvent in the method is diethyl ether. By way of further example, in one embodiment, the solvent in the method is ethanol. By way of further example, in one embodiment, the solvent in the method is methanol.

In certain embodiments, the lithium-stable separator in the method has defects on the surface.

In certain embodiments, provided is a composition including A.(LiBH$_4$).B.(LiX).C.(LiNH$_2$), where X is fluorine, bromine, chloride, iodine, or a combination thereof, and wherein 0.1≤A≤3, 0.1≤B≤4, and 0<C≤9 having a XRD pattern characterized by peaks at approximately 14.5°, 15.5°, 16.4° 19.3° and 29.6° 2θ. For example, in one embodiment, provided is a composition including A.(LiBH$_4$).B.(LiX).C.(LiNH$_2$), where X is fluorine, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$).B.(LiX).C.(LiNH$_2$), where X is bromine, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$).B.(LiX).C.(LiNH$_2$), where X is chloride, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$.).B.(LiX).C.(LiNH$_2$), where X is iodine, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$).B.(LiX).C.(LiNH$_2$), where X is fluorine, bromine, and chloride, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$).B.(LiX).C.(LiNH$_2$), where X is fluorine, bromine, and iodine, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$).B.(LiX).C.(LiNH$_2$), where X is fluorine, chloride, and iodine, and wherein 0.1≤A≤3, 0.1≤B≤4, and 0<C≤9 having a XRD pattern characterized by peaks at approximately 14.5°, 15.5°, 16.4° 19.3° and 29.6° 2θ. By way of further example, in one embodiment, provided is a composition including A.(LiBH$_4$).B.(LiX).C.(LiNH$_2$), where X is bromine, chlorine, and iodine, and wherein 0.1≤A≤3, 0.1≤B≤4, and 0<C≤9 having a XRD pattern characterized by peaks at approximately 14.5°, 15.5°, 16.4° 19.3° and 29.6° 2θ.

EXAMPLES

In the examples described herein, the subscript values for the lithium-stuffed garnets represent elemental molar ratios of the precursor chemicals used to make the claimed composition.

Electron microscopy was performed in a FEI Quanta SEM, a Helios 600i, or a Helios 660 FIB-SEM, though equivalent tools may be substituted. XRD was performed in a Bruker D8 Advance ECO or a Rigaku Miniflex 2. EIS was performed with a Biologic VMP3, VSP, VSP-300, SP-150, or SP-200.

Example 1—Garnet Coated with LBHI

A LBHI powder was prepared by mixing three (3) molar parts LiBH$_4$ with one (1) molar part LiI. The mixture was then subjected to two (2) millings in zirconia vessels at 300 rpm for 8 h, followed by annealing at 300° C. in a sealed vessel and cooled to room temperature to form a mixed and annealed LBHI powder.

A thin garnet film (Li-stuffed garnet characterized as approximately Li$_{7-x}$La$_3$Zr$_2$O$_{12}$Al$_2$O$_3$) was prepared as follows. Garnet precursors were mixed in a molar ratio of 6-7:1.5:2:0.1-1.5 of LiOH, ZrO$_2$, La$_2$O$_3$, and boehmite. The mixed precursors were milled in a ball mill and calcined at 700-1000° C. for 1-10 hours to form the cubic garnet phase with second phases. The powder was milled in a wet mill with solvent, surfactant, and dispersant. A binder solution was prepared by dissolving binder in the same solvent. The binder solution and powder slurry were mixed and tape cast on a mylar substrate with a doctor blade of gap height 10-300 μm to form a cast green tape. The green tape was released from the substrate, cut to the desired size, sintered between setters at 800-1200° C. for 1-10 hours and cooled to form a sintered garnet thin film.

Mixed and annealed LBHI powder (1-4 g) was heated to 300-350° C. under an argon atmosphere in a boron nitride or alumina crucible placed in a stainless steel heating block equipped with a band heater for about 2 h until the LBHI powder melted. The thin garnet film was dip-coated once into molten LBHI, at 300-350° C., under argon with a dwell time of 600 s. The thin garnet film was then withdrawn from the molten LBHI at a rate of 0.05-300 mm min$^{-1}$ and allowed to cool under argon for 5 s to 5 min to provide a dip-coated LBHI garnet. Characteristics for the dip-coated LBHi garnet and the molten and stable LBHi are described below with reference to one or more of the Figures.

Figure 4:
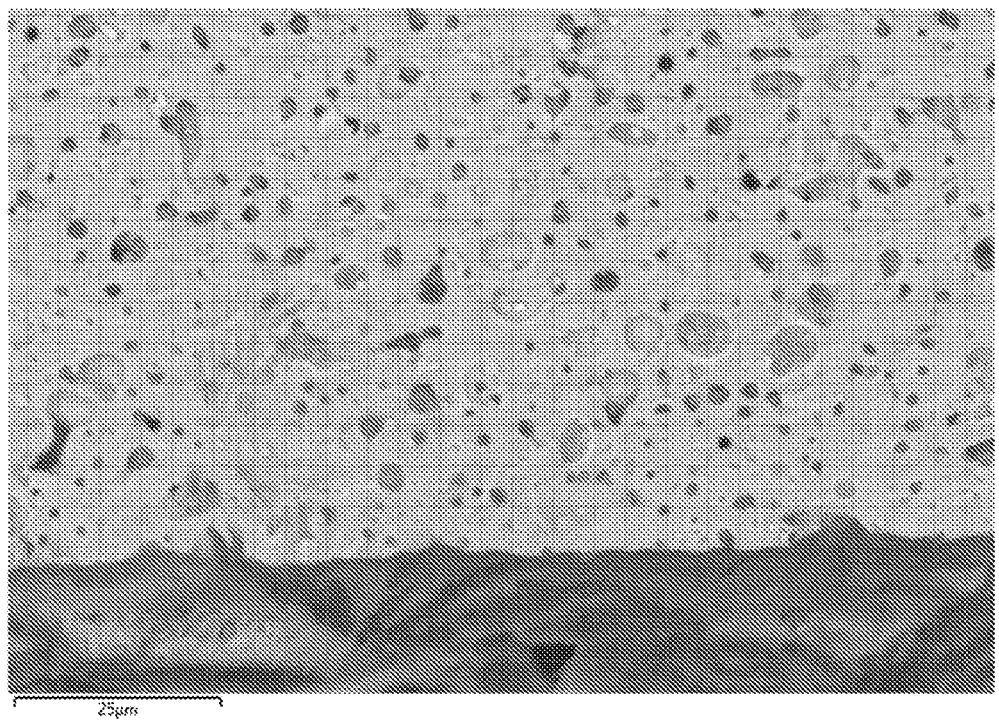
FIG. 4 shows a focused-ion beam scanning electron microscopy (FIB-SEM) image of a cross-section of a dip-coated LBHI-garnet, made in Example 4, having a coating of $3(LiBH_4):1(LiI)$ on a lithium-stuffed garnet free-standing thin film, where the arrows A and B indicate regions of LBHI infilling within the garnet. The scale bar is 25 μm.
Figure 5:
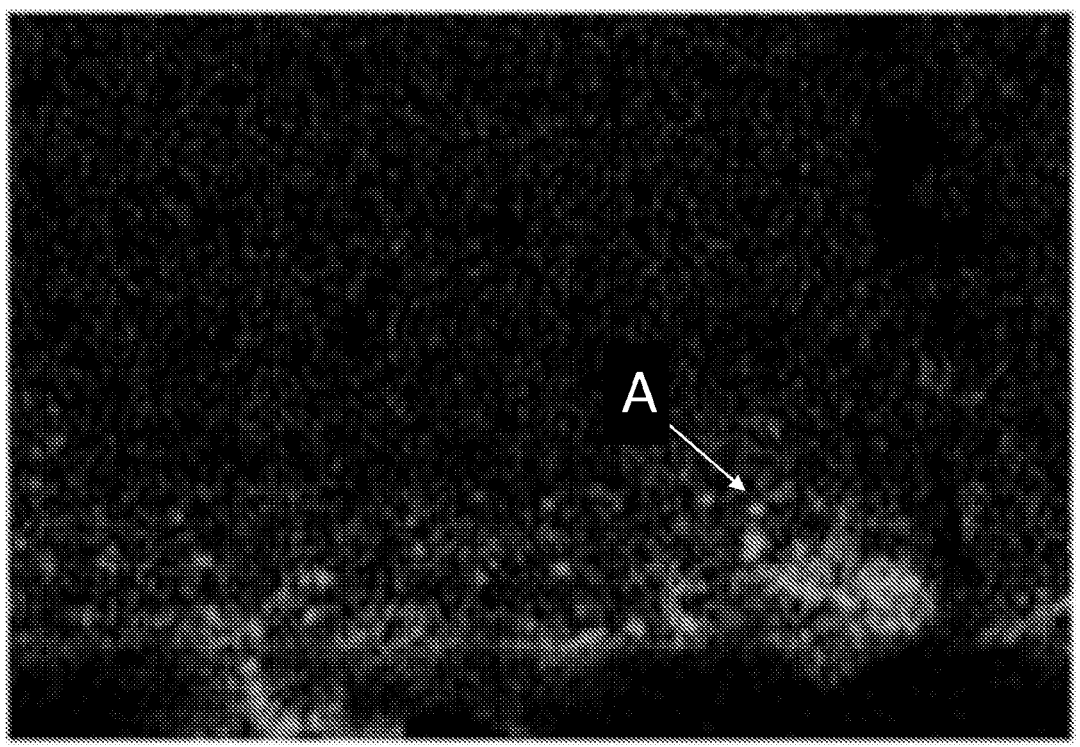
FIG. 5 shows a dip-coated LBHI-garnet having a coating of $3(LiBH_4):1(LiI)$ on a lithium-stuffed garnet free standing thin film, where LBHI penetration is measured by energy-dispersive x-ray (EDX) spectroscopy according to an iodine signal (gray, A). The scale bar is 100 μm.

FIG. 4 is a cross-section of a dip-coated LBHI-garnet, made by the method in the previous paragraph. FIG. 4 shows surface channels, through-pores, or surface pores that pass into the garnet surface and that are filled with LBHI. The channels, through-pores, or surface pores are present at least 100 μm below the garnet surface. For example, A and B in FIG. 4 indicate LBHI within one or more channels, through-pores, or surface pores and defects in the garnet surface. FIG. 5 shows a dip-coated LBHI-garnet, made by the method in the previous paragraph, where LBHI penetration extends at least 100 μm into the garnet surface. The iodine signal from the EDX is shown. Unexpectedly, the LBHI wets a lithium-stuffed garnet surface sufficiently to wick into deep pores.

Figure 8A:
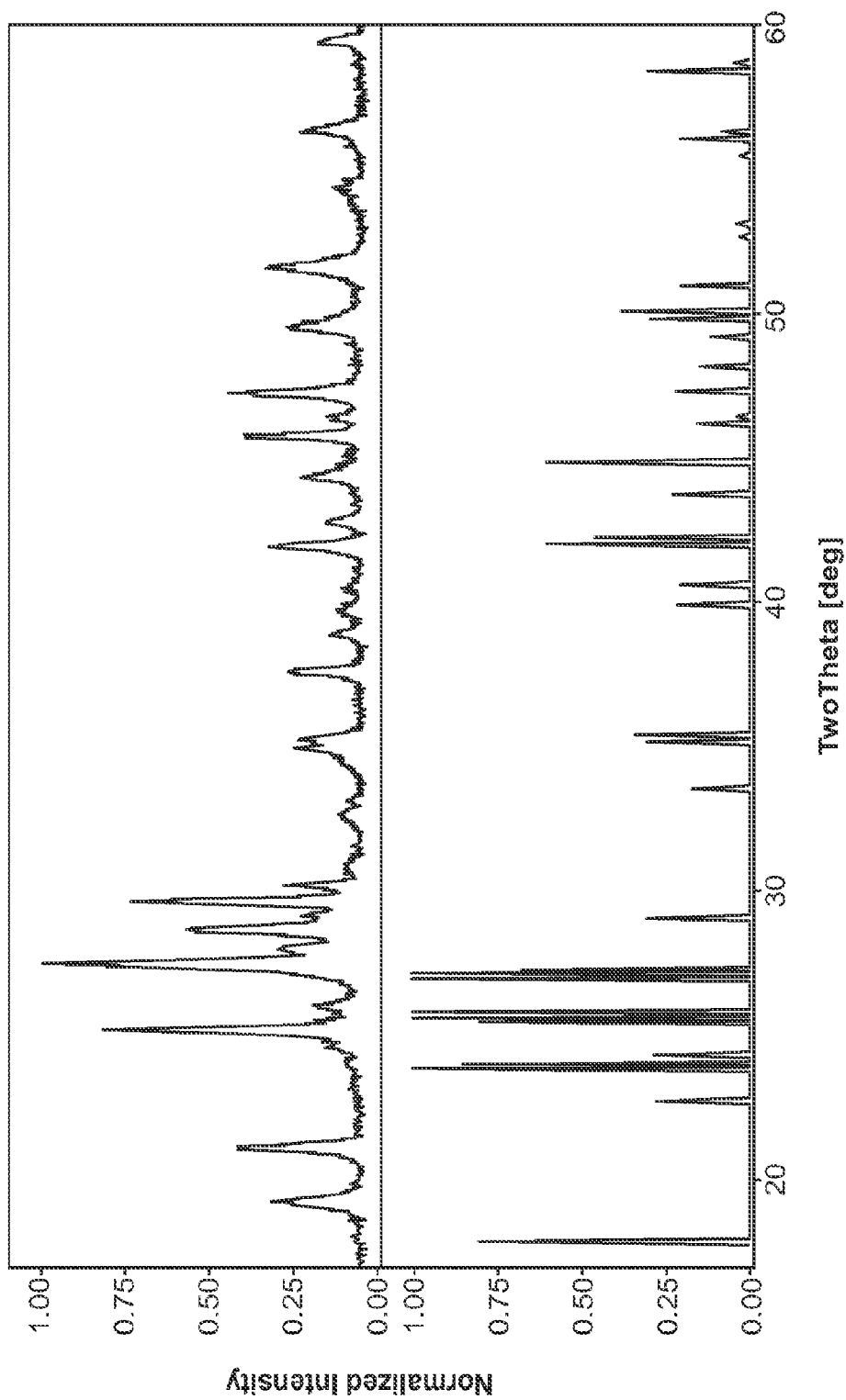
FIG. 8A shows an overlaid XRD plot for a dip-coated (top) and powder (bottom) LBHI, as described in Example 1.
Figure 8B:
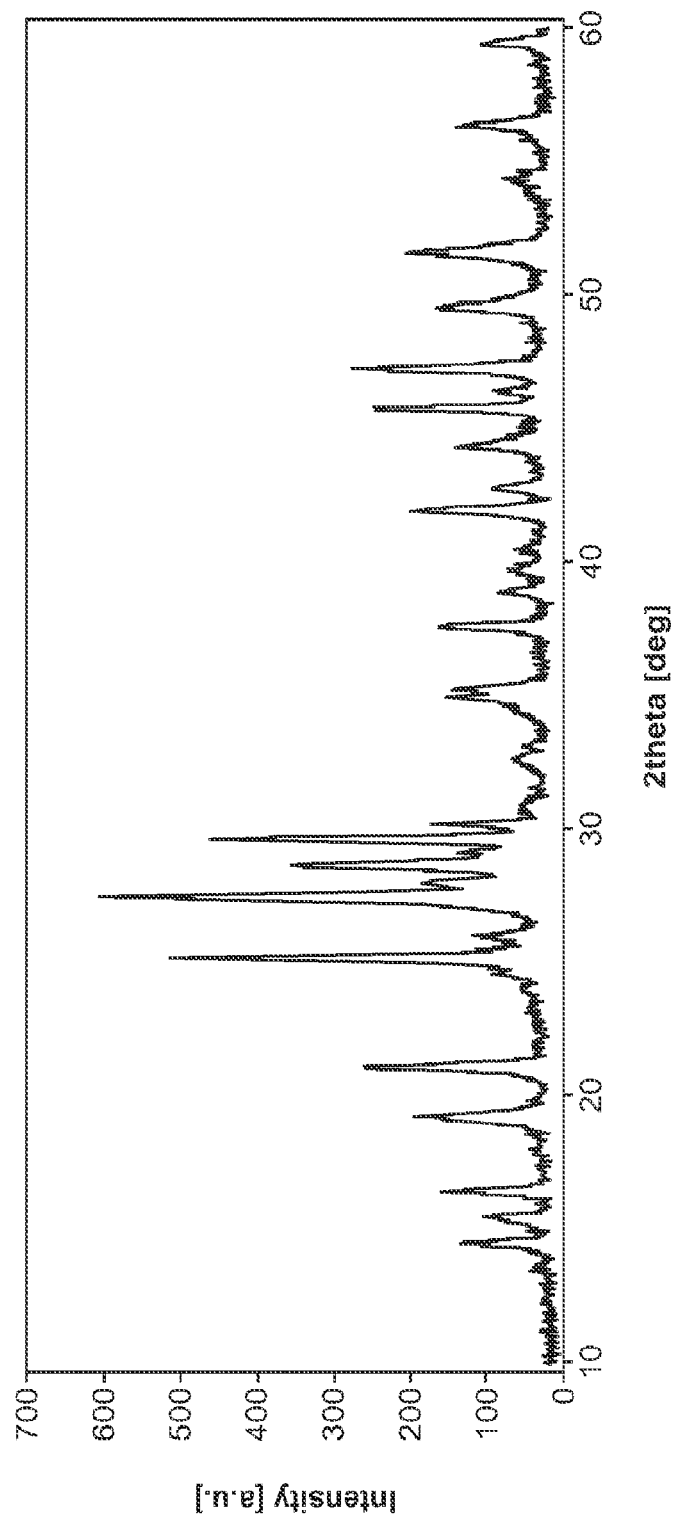
FIG. 8B shows another XRD plot for a dip-coated LBHI with a wider range for 2θ, as described in Example 1.

FIG. 8A shows an XRPD plot for a dip-coated LBHI-garnet (top) and a reference spectra of LBHI (bottom) including characteristic peaks for LiI and LiBH$_4$. FIG. 8B shows another XRPD plot for a dip coated LBHI with a wider 2θ range including characteristic peaks at approximately 14.5°, 15.5°, 16.4° 19.3° and 29.6° 2θ.

Example 2—Copper Coated with LBHI

LBHI was prepared and heated to 300-350° C., as in Example 1. A thin copper current collector foil was then dip-coated once into the molten LBHI at 300-350° C. under argon with a dwell time of 600 s. The copper was then withdrawn from the molten LBHI at a rate of 0.05-300 mm min$^{-1}$ and allowed to cool under argon for 5 s to 5 min to provide a dip-coated LBHI copper.

Example 3—ASR and Calendar Life

Figure 7:
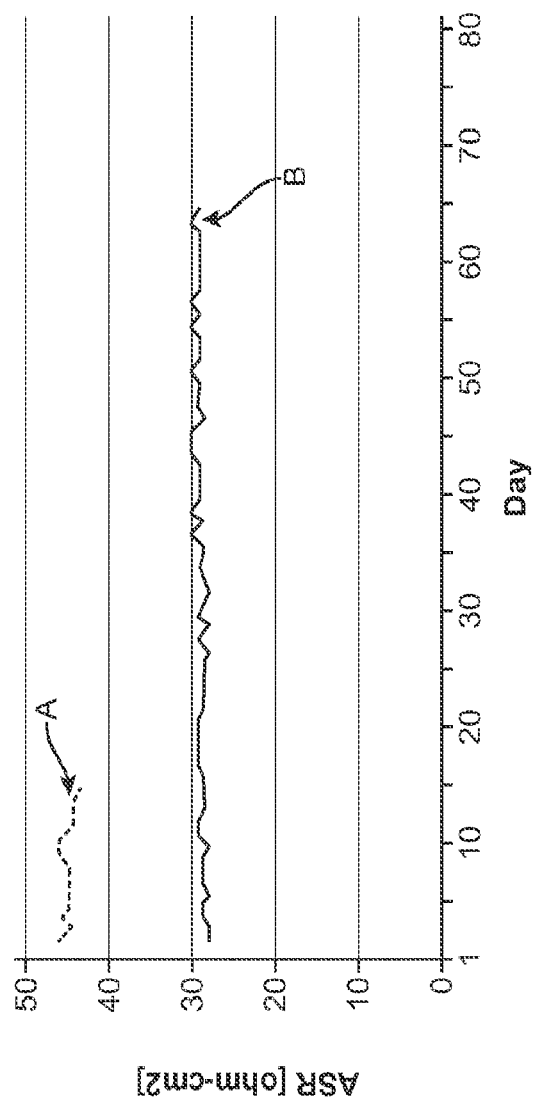
FIG. 7 shows comparative calendar life plots of resistance versus time for uncoated garnet separators (gray, A top plot) versus dip-coated LBHI garnet separators (black, B bottom plot).

Dip-coated LBHI-garnet was prepared as in Example 1. ASR and calendar life were tested as follows. Uncoated garnet and dip-coated LBHI garnet were contacted on both sides with Li electrodes (8 mm contact area) and were subjected to 0.5 mA cm$^2$ current density with 30 s pulses twice daily (forward and reverse) at 80° C. and 300 PSI. FIG. 7 shows that, unexpectedly, uncoated garnet (gray line, A) had comparatively higher magnitudes of ASR than dip-coated LBHI garnet (black line, B). Further, the ASR was stable over time (i.e., non-increasing), which is a desirable feature for batteries.

Example 4—Cycling

Figure 6:
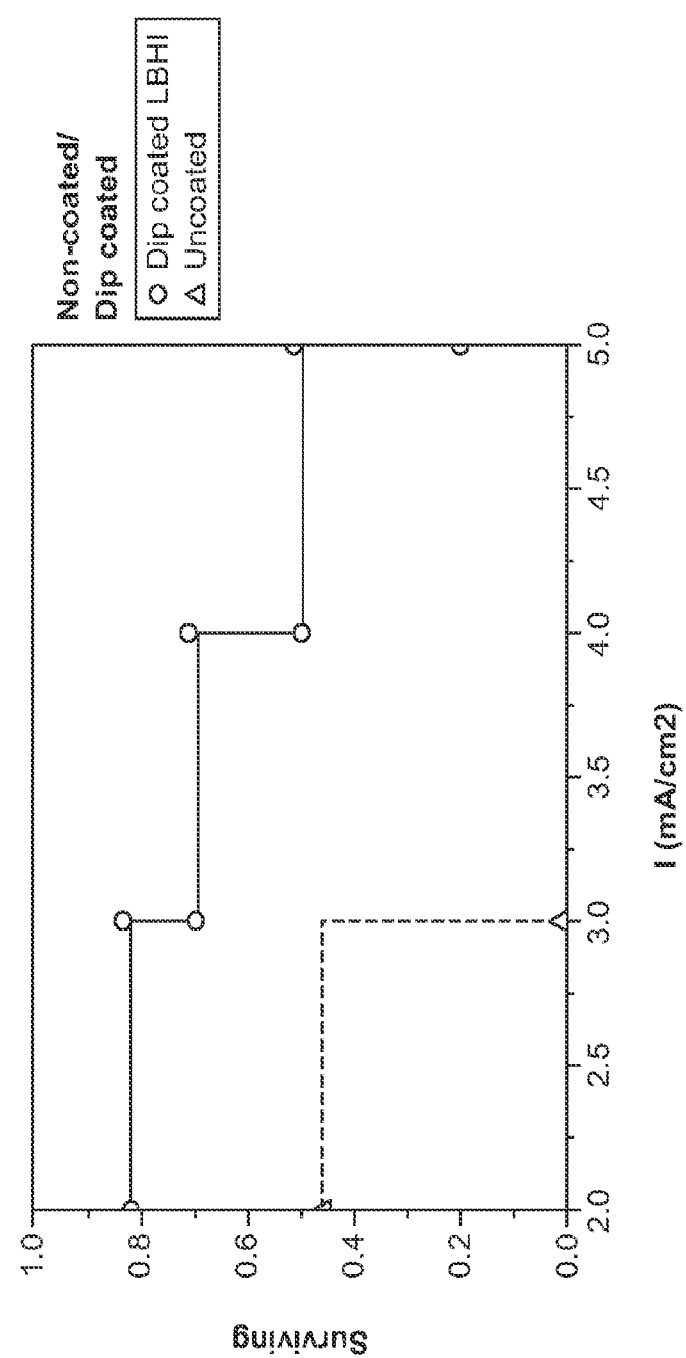
FIG. 6 shows comparative Kaplan-Meier electrochemical survival plots as a function of current density for uncoated garnet separators versus dip-coated LBHI-garnet separators, as described in Example 4.
Figure 11:
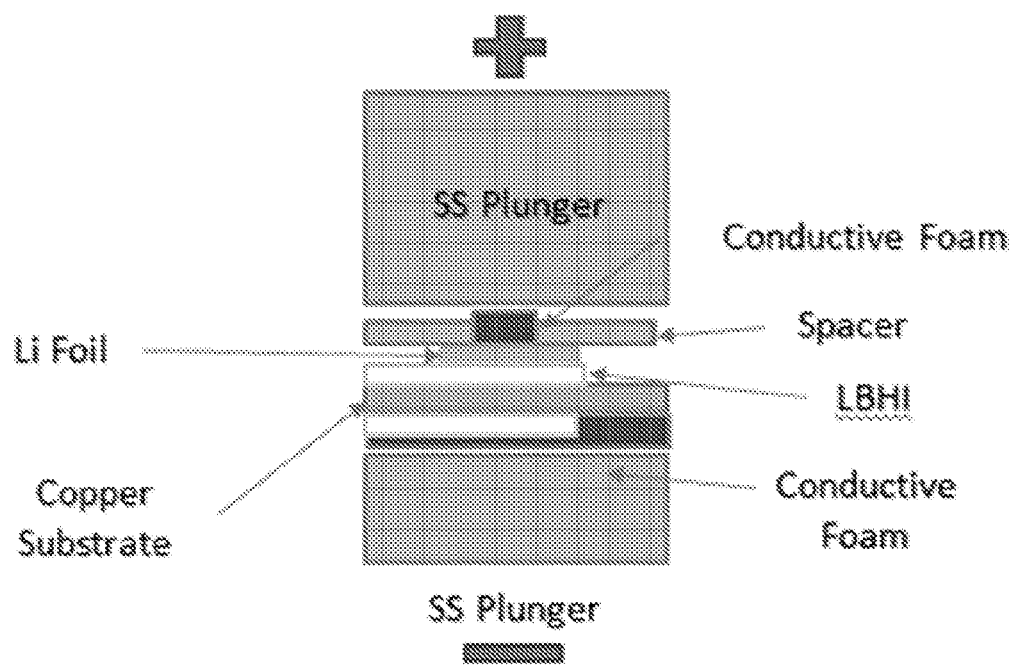
FIG. 11 shows a schematic for one embodiment of a testing apparatus in Example 4.

Separators (uncoated garnet films or LBHI-coated garnet films prepared according to Example 1) were placed in a symmetric electrochemical cell with Li-metal electrodes on both sides of the samples. FIG. 11 shows the testing apparatus used. 5000 PSI of hydrostatic pressure was uniaxially applied to both sides of the cells under controlled temperature and under argon. Then, 5 cycles of 20 planar microns of lithium (approximately 4 mAh/cm$^2$) at 2 mA/cm$^2$ at 80° C. were passed over an 8 mm electrode contact area. For surviving (non-shorted samples), the current was increased to 3 mAh/cm$^2$ at 80° C. For surviving samples, the current was then increased to 4 mAh/cm$^2$ at 80° C. followed by increasing to 5 mAh/cm$^2$ at 80° C. for surviving samples. FIG. 6 shows a survivability plot as a function of current density of uncoated garnet (dotted gray line) with garnet dip-coated with LBHI (solid black line) where dip-coated LBHI garnet had improved survivability as compared to the uncoated garnet at higher current density. The larger surviving fraction of LBHI-coated separators at high current density shows that the LBHI-coated separators were more robust to dendrite formation than the uncoated garnet separators.

Example 5—DSC

Differential scanning calorimetry (DSC) experiments for LBHI powder with varying amounts of amide dopants and LiI, were conducted.

A LBHI powder with varying amounts of amide dopants and LiI was prepared according to the methods in Example 1. LiBH$_4$ and LiI were mixed at determined ratios. The mixture was then subjected to two (2) millings in zirconia vessels at 300 rpm for 8 h, followed by annealing at 300° C. The resulting powder (1-4 g) was heated to 300-350° C. under an argon atmosphere in a boron nitride or alumina crucible placed in a stainless steel heating block equipped with a band heater for about 2 h until the powder melted.

The introduction of amides allowed for the formation of, in some examples, a eutectic mixture where the melting temperature for the LBHI may be reduced (or modified) depending on the amide content. For example, LiNH$_2$:LiBH$_4$:LiI (3:3:2) provided a melting point of about 120° C. with an dip-coating temperature range of about 120-165° C. In another example, LiNH$_2$:LiBH$_4$:LiI (9:3:4) provided a melting point of about 125° C. with a dip coating temperature range of about 125-160° C. In another example, LiNH$_2$:LiBH$_4$:LiI (9:3:2) provided a phase transition at about 85° C., and a melting point of about 125° C. Gas evolution at about 100° C. was observed for LiNH$_2$:LiBH$_4$:LiI (9:3:2).

Figure 17:
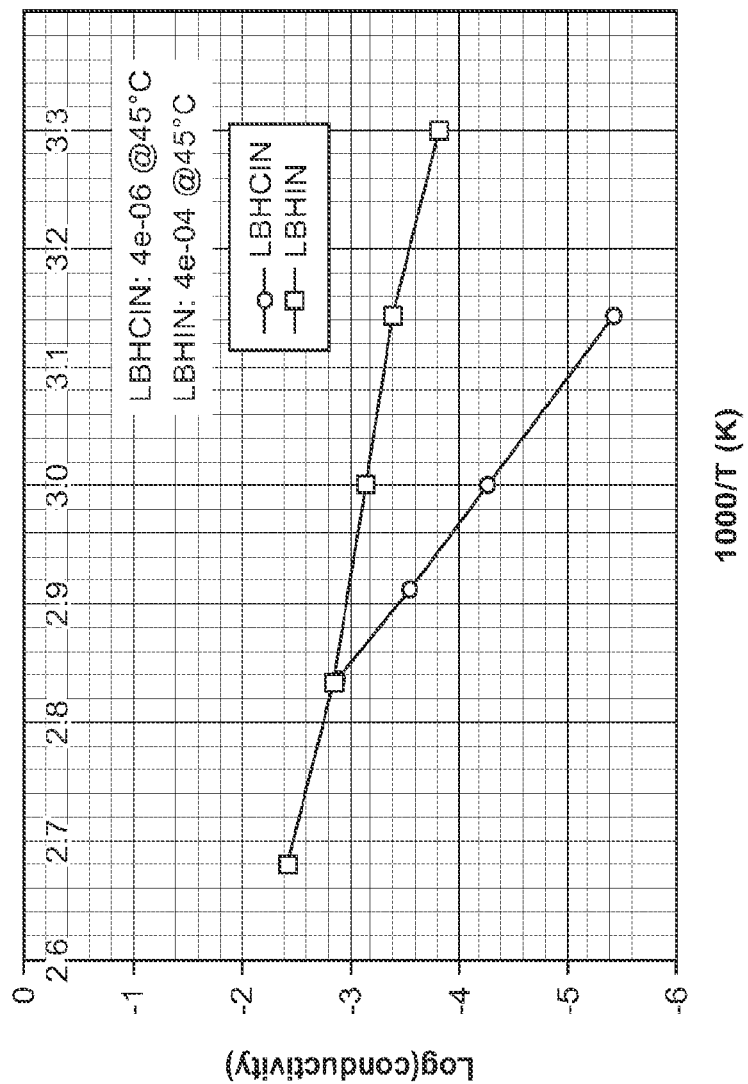
FIG. 17 shows conductivity data for $LiNH_2:LiBH_4:LiCl$ (3:3:2) (labeled LBHClN) and $LiNH_2:LiBH_4:LiI$ (3:3:2) (labeled LBHIN).

The separator material, LBHClN—LiNH$_2$:LiBH$_4$:LiCl (3:3:2)—or LBHIN—LiNH$_2$:LiBH$_4$:LiI (3:3:2)—was dip-coated onto a metal foil substrate that served as a back electrode. After cooling, a metal foil was placed on top to serve as a top electrode. Both electrodes were blocking to lithium. EIS was performed on the cell between 0.1 Hz 100 kHz and the total resistance was extracted. The total resistance represents the bulk resistance of LBHClN or LBHIN, from which conductivity may be calculated. The results are shown in FIG. 17.

Example 6—Total Resistance

Figure 9:
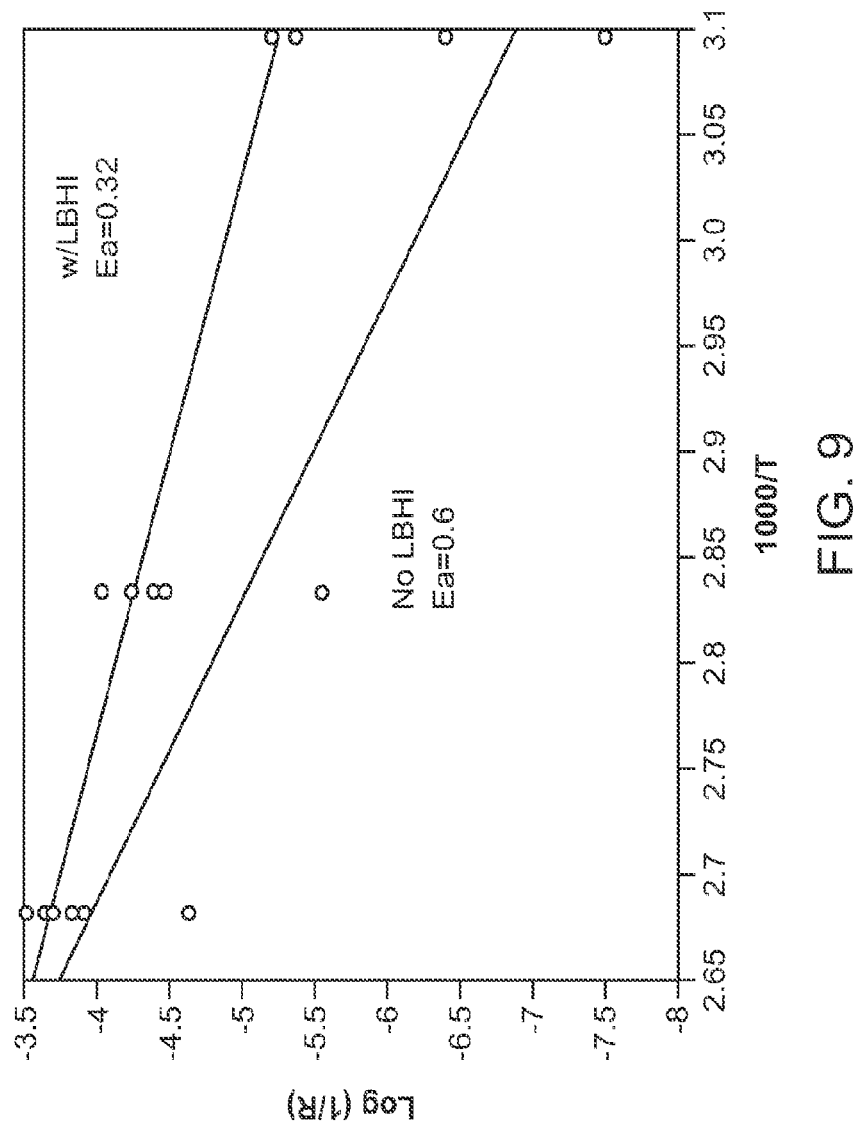
FIG. 9 shows an Arrhenius plot of conductance (1/R) versus reciprocal temperature (1000/T) (Kelvin) for a LBHI-coated lithium-stuffed garnet (top plot, labeled w/LBHI) and an uncoated lithium-stuffed garnet (bottom plot, labeled No LBHI), as described in Example 8.

LBHI was prepared, and garnet was coated with LBHI as in Example 1. FIG. 9 shows an Arrhenius plot of conductance (1/R, where resistance is measured in ohms) versus reciprocal temperature (1000/T) (T in Kelvin), where an LBHI coated lithium-stuffed garnet reduced the surface resistance of the lithium-stuffed garnet. As shown in FIG. 9, the LBHI coated garnet (top plot) had a more shallow slope compared to non-coated garnet (bottom plot), indicative of a lower activation energy and lower area-specific surface resistance. Alternatively stated, the LBHI coated substrate reduced the surface resistance of the lithium-stuffed garnet.

Example 7—Conductivity Following Amide Doping

Figure 10:
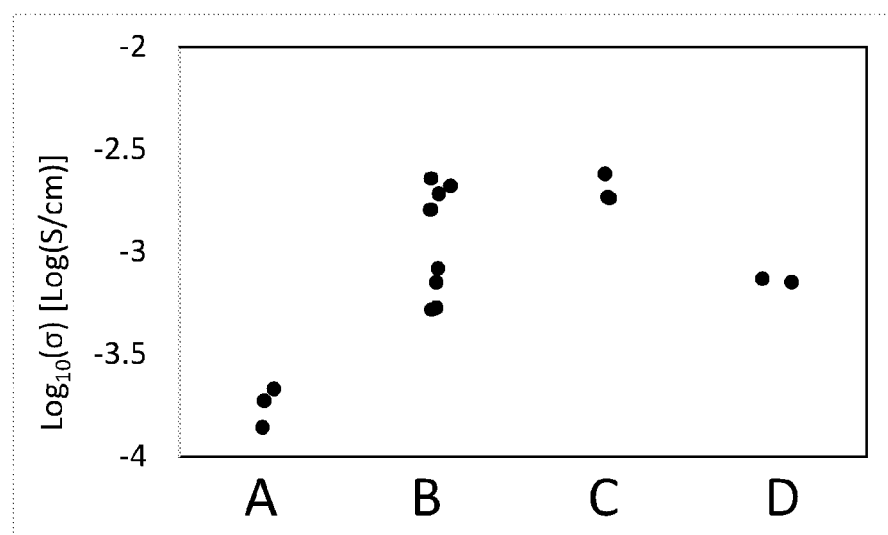
FIG. 10 shows a plot for LBHI and LBHI with amide dopants versus conductivity at 60° C., where several measurements for compositions $LiBH_4:LiI$ (3:1), $LiNH_2:LiBH_4:LiI$ (3:3:2), $LiNH_2:LiBH_4:LiI$ (9:3:4), and $LiNH_2:LiBH_4:LiI$ (9:3:2) are shown, as described in Example 7.

LBHI was prepared, and samples of 3 compositions of LiNH$_2$:LiBH$_4$:LiI were prepared for comparison. Each powder was compacted in a die under a pressure of 100-10,000 PSI to form a pressed pellet. After applying metallic electrodes, Electrochemical Impedance Spectroscopy (EIS) was performed on the pressed pellets to measure the bulk conductivity of each sample prepared by the method in this Example. EIS was performed by attaching a Biologic VMP3 to lithium contacts deposited on two sides of a sample. An AC voltage of 25 mV rms is applied and swept across a frequency of 300 kHz-0.1 mHz while the current is measured. As is known in the art, EIS allows partitioning of the ASR into bulk and interfacial ASR by resolving two semi-circles in a Nyquist plot. An interfacial ASR (ASR$_{interface}$) is calculated from the interfacial resistance (R$_{interface}$) via the equation, ASR$_{interface}$=R$_{interface}$*A/2 where A is the area of the electrodes in contact with the separator and the factor of 2 accounts for 2 interfaces, assuming they are symmetric. Ionic conductivity, σ$_i$, is calculated from the bulk resistance (R$_{bulk}$) via σ$_i$=d/R$_{bulk}$A where d is the thickness of the sample. The results of a conductivity measurement are shown in FIG. 10. Notably, LiNH$_2$:LiBH$_4$:LiI (9:3:4) shows a 10-fold increase in conductivity at 60° C. versus LiBH$_4$:LiI (3:1).

Example 8—Full Cell with LBHClN Bonding Lithium-Stuffed Garnet Film and Solid-State Cathode (SSC)

LBHClN was prepared by mixing three (3) molar parts LiBH$_4$, three (3) molar parts of LiNH$_2$, with one (1) molar part LiCl. The mixture was then subjected to two (2) millings in zirconia vessels at 300 rpm for 8 h, followed by annealing in a sealed vessel at 180° C. for 2 hours and cooling to form a LBHClN powder.

Lithium-stuffed garnet film was prepared as in Example 1 and lithium metal was applied on one side. Then the LBHClN powder was dropped on the other side of the lithium-stuffed garnet film. The lithium-stuffed garnet with LBHClN powder on it was then heated to 80-140° C. at which point the LBHClN powder melted.

A Sulfide containing solid-state cathode film (SSC) was prepared. The SSC included a sulfide catholyte, LSTPS, and cathode active materials (NCA) with a LSTPS:NCA volumetric ratio of approximately 1/3 and 2/3. A small amount of carbon and binder, about 0-5 wt %, was added to the LSTPS and NCA. These resulting combination of LSTPS/NCA/carbon/binder was suspended in toluene at a mass loading of 20% powder in toluene. Then the suspension was mixed using a Flacktek and Filmix for 15 mins and 6 mins, respectively. The mixture then was casted on to carbon-coated aluminum foil and allowed to dry in an argon atmosphere until toluene evaporated. The film was punched to the desired size. The SSC film was densified at 180° C. under pressure of 300,000 PSI. This cathode is labeled A in FIG. 14. A bonding layer LBHClN (labeled B in FIG. 14) was cast on top of the cathode. A thin film lithium-stuffed garnet separator was pressed on the bonding layer. The thin film lithium-stuffed garnet separator is labeled C in FIG. 13.

Figure 13:
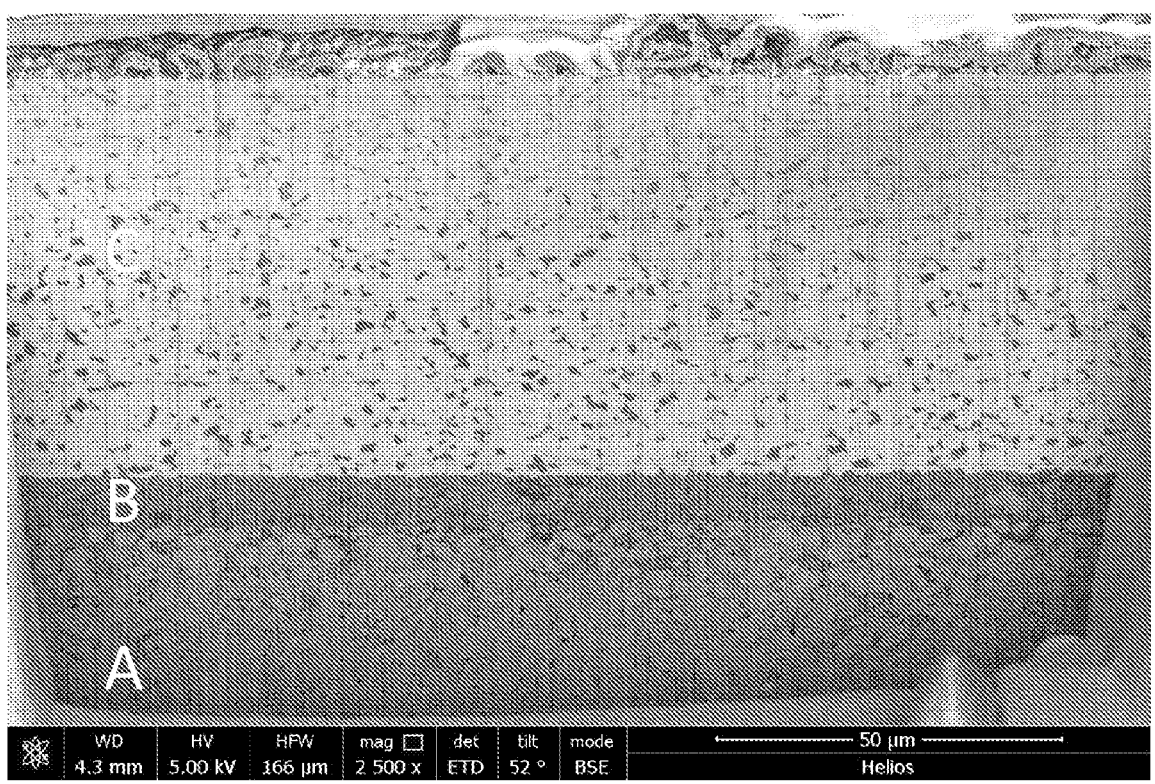
FIG. 13 shows a lithium-stuffed garnet film (labeled C) and a solid-state cathode film (labeled A) which are bonded with a composition of $LiNH_2:LiBH_4:LiI$ (3:3:2) (labeled B) using molten $LiNH_2:LiBH_4:LiI$ (3:3:2). The scale bar is 50 μm.
Figure 14:
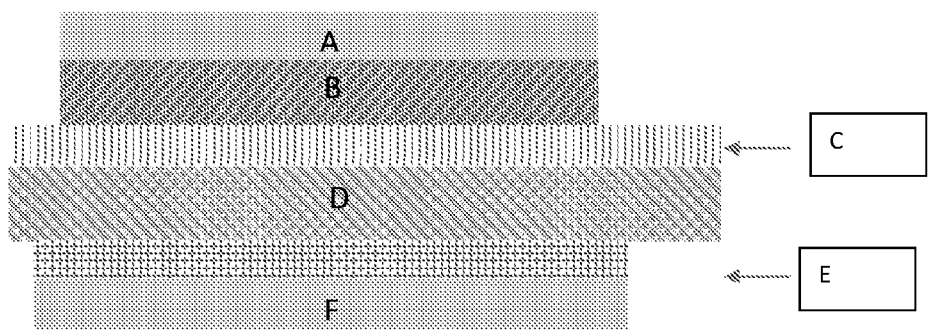
FIG. 14 shows test full cell structure of a lithium-stuffed garnet film and a solid-state cathode film are bonded with composition of $LiNH_2:LiBH_4:LiCl$ (3:3:2) using molten $LiNH_2:LiBH_4:LiI$ (3:3:2). In the figure, A is current collector; B is a sulfide containing solid-state cathode; C is $3.(LiBH_4).2.(LiCl).3.(LiNH_2)$; D is Li-stuffed garnet film; E is evaporated lithium; and F is current collector.
Figure 15:
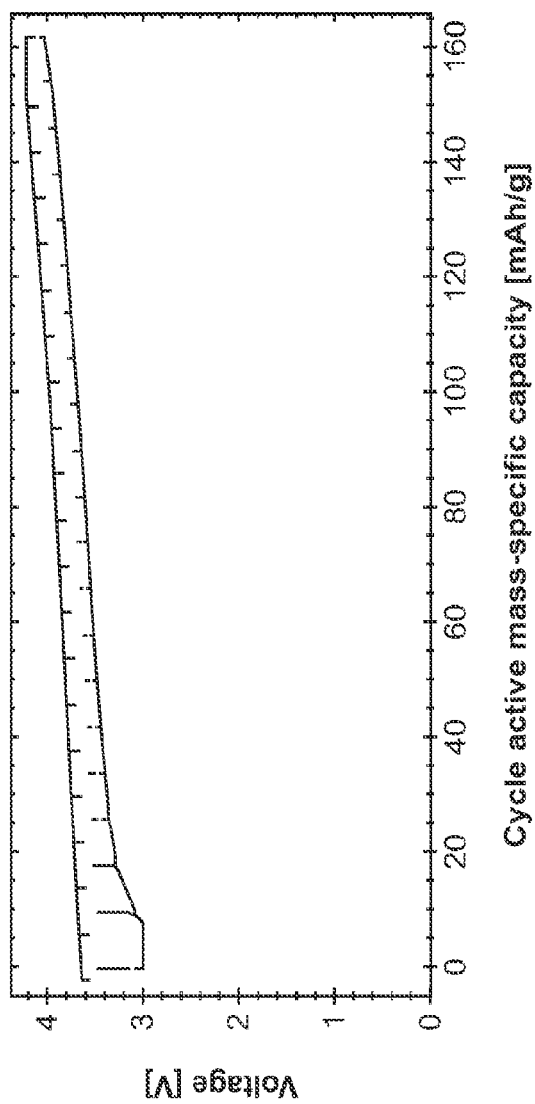
FIG. 15 shows cycling data of the cell illustrated in FIG. 14 which consisted of lithium-stuffed garnet film and a solid-state cathode film bonded with molten composition of $LiNH_2:LiBH_4:LiCl$ (3:3:2).
Figure 16:
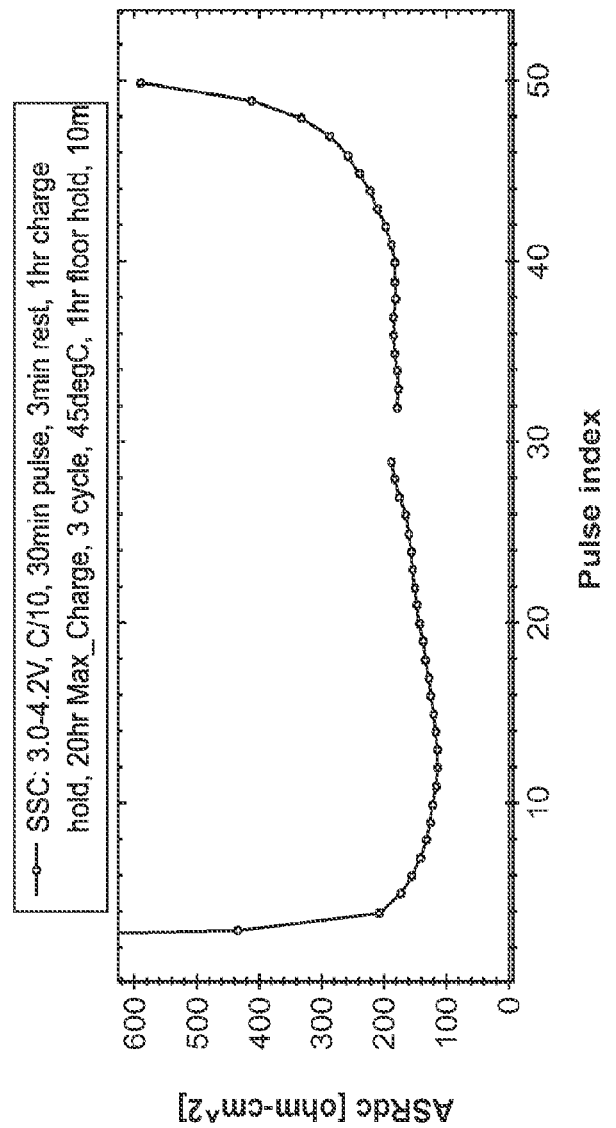
FIG. 16 shows an area-specific resistance (ASR) plot of the cell illustrated in FIG. 14 on the first electrochemical cycle.

Then the SSC film was placed on top of the melted LBHClN powder. The SSC film was then pressed at 10-2000 pounds per square inch (PSI) while being cooled to room temperature. This resulted in a full cell as shown in FIG. 13. The cell was cycled at C/10 rate, at 45° C. The cycling data and full cell ASR are shown in FIGS. 15 and 16, respectively.

Example 9—Spin Casting

An LBHXN powder was fabricated as above, where X was be Cl, Br, or I, or a mixture thereof. Spin casting was used to deposit the bonding layer of LBHXN thin film on to a lithium-stuffed garnet or on to a SSC film. In this procedure, a small amount of LBHXN powder was applied to the center of the lithium-stuffed garnet or SSC film, which was on a chuck of a spin coater heated to the LBHXN melting temperature (~100-280° C.). LBHXN melted once the melting temperature was reached. A flat spatula was used to cast the melted LBHXN on the substrate to cover the area. The spin coater was turned on to the speed of 100 rpm to 5000 rpm while the chuck was still at the temperature needed to melt LBHXN. The spin coater was turned off after 1-10 min. After cooling to room temperature, a uniform coating of LBHXN was achieved on the substrate.

Example 10—LBHIN Composition

LBHIN having the composition $LiNH_2$:$LiBH_4$:LiI (3:3:2) was coated on a solid-state cathode film by the drop casting method. Specifically, LBHIN powder was prepared and cast on a densified solid-state cathode. An uncoated lithium-stuffed film (made according to Example 1) was pressed on the LBHIN layer at 20-2000 PSI and 20-350° C.

Figure 12:
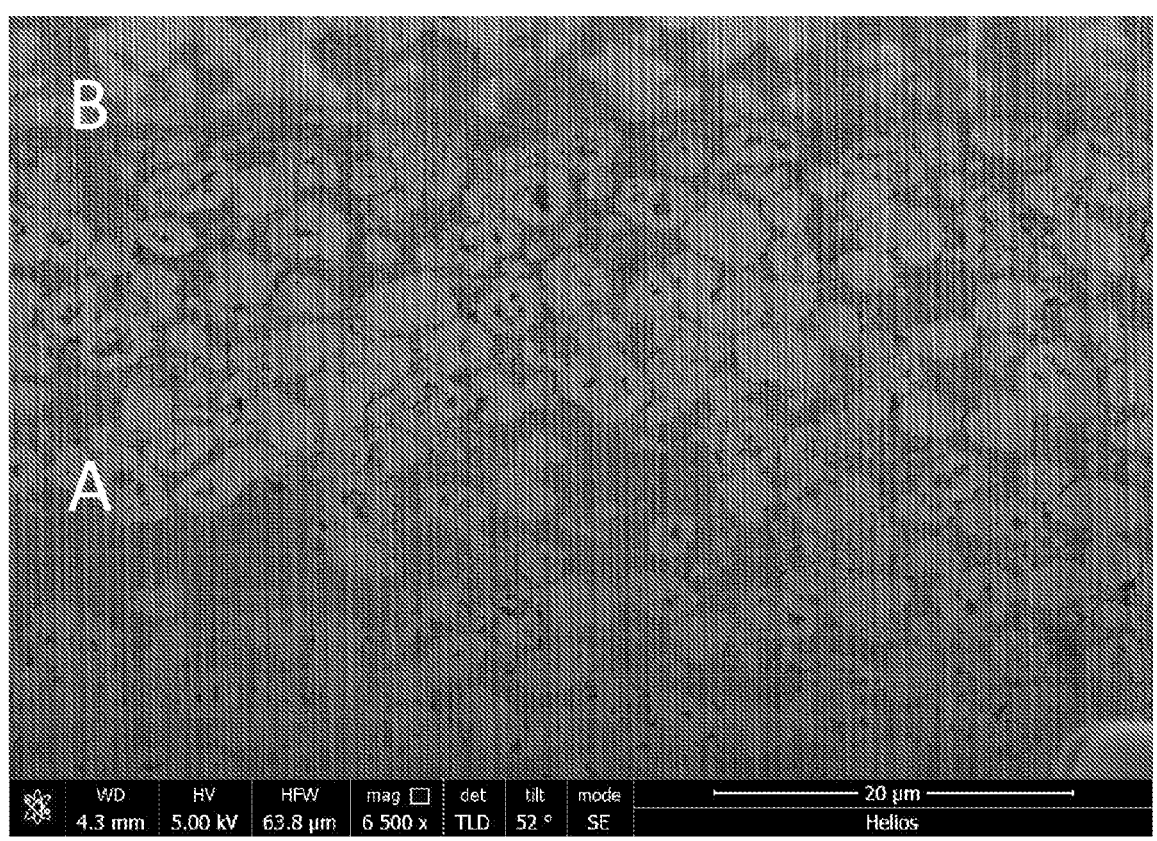
FIG. 12 shows LBHIN coated on a solid-state cathode film by drop casting method. In the figure, A is solid-state cathode film and B is $LiNH_2:LiBH_4:LiI$ (3:3:2), as described in Example 11. The scale bar is 20 μm.

In FIG. 12, A is the solid-state cathode film and B is the LBHIN.

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. A composition, comprising:

$A.(LiBH_4).B.(LiX).C.(LiNH_2)$, wherein X is fluorine, bromine, chlorine, iodine, or a combination thereof, and
    wherein either:
    A is 2; B is 1; and C is 2; or
    A is 3; B is 3; and C is 4.

2. The composition of claim 1, wherein X is chlorine.

3. The composition of claim 1, wherein X is bromine.

4. The composition of claim 1, wherein X is iodine.

5. The composition of claim 1, wherein the composition is amorphous.

6. The composition of claim 1, wherein the composition is semi-crystalline.

7. The composition of claim 1, wherein the composition has a lithium ion conductivity greater than $1 \times 10^{-4}$ S/cm at 60° C.

8. The composition of claim 1, wherein the composition is a thin film.

9. The composition of claim 1, further comprising an oxide, a sulfide, a sulfide-halide, or a combination thereof.

10. The composition of claim 9, wherein the oxide is a lithium-stuffed garnet characterized by the formula $Li_xLa_yZr_zO_t \cdot qAl_2O_3$, wherein $4<x<10$, $1<y<4$, $1<z<3$, $6<t<14$, and $0 \leq q \leq 1$.

11. The composition of claim 10, wherein the lithium-stuffed garnet is doped with Nb, Ga, and/or Ta.

12. The composition of claim 9, wherein the oxide is a lithium-stuffed garnet characterized by the formula $Li_aLa_bZr_cAl_dMe''_eO_f$, wherein $5<a<8.5$; $2<b<4$; $0 \leq c \leq 2.5$; $0 \leq d<2$; $0 \leq e<2$, and $10<f<13$ and Me'' is a metal selected from the group consisting of Nb, Ga, Ta, and combinations thereof.

13. The composition of claim 9, wherein the sulfide or sulfide-halide is selected from LSS, SLOPS, LSTPS, LSTPSCl, SLOBS, LATS, or LPS+X, wherein X is selected from the group consisting of Cl, I, and Br.

14. The composition of claim 9, wherein the oxide is a lithium-stuffed garnet oxide characterized by the formula $Li_uLa_vZr_xO_y \cdot zAl_2O_3$, wherein u is a rational number from 4 to 8;
v is a rational number from 2 to 4;
x is a rational number from 1 to 3;
y is a rational number from 10 to 14;
z is a rational number from 0.05 to 1; and
wherein u, v, x, y, and z are selected so that the lithium-stuffed garnet oxide is charge neutral.

15. The composition of claim 9, wherein the oxide is a lithium-stuffed garnet oxide characterized by the formula $Li_uLa_vZr_xO_y \cdot zTa_2O_5$, wherein u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

16. The composition of claim 9, wherein the oxide is a lithium-stuffed garnet oxide characterized by the formula $Li_uLa_vZr_xO_y \cdot zNb_2O_5$, wherein u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

17. The composition of claim 9, wherein the oxide is a lithium-stuffed garnet oxide characterized by the formula $Li_uLa_vZr_xO_y \cdot zGa_2O_5$, wherein u is a rational number from 4 to 10;
v is a rational number from 2 to 4;
x is a rational number from 1 to 3;
y is a rational number from 10 to 14; and
z is a rational number from 0 to 1;
wherein u, v, x, y, and z are selected so that the lithium-stuffed garnet oxide is charge neutral.

18. The composition of claim 9, wherein the oxide is a lithium-stuffed garnet oxide characterized by the formula $Li_uLa_vZr_xO_y \cdot zTa_2O_5 \cdot bAl_2O_3$, wherein u is a rational number from 4 to 10;
v is a rational number from 2 to 4;
x is a rational number from 1 to 3;
y is a rational number from 10 to 14;
z is a rational number from 0 to 1;
b is a rational number from 0 to 1;
wherein $z+b \leq 1$; and
u, v, x, y, and z are selected so that the lithium-stuffed garnet oxide is charge neutral.

19. The composition of claim 9, wherein the oxide is a lithium-stuffed garnet oxide characterized by the formula $Li_uLa_vZr_xO_y \cdot zNb_2O_5 \cdot bAl_2O_3$, wherein u is a rational number from 4 to 10;
v is a rational number from 2 to 4;
x is a rational number from 1 to 3;
y is a rational number from 10 to 14;
z is a rational number from 0 to 1;
b is a rational number from 0 to 1;
wherein $z+b \leq 1$; and
u, v, x, y, and z are selected so that the lithium-stuffed garnet oxide is charge neutral.

20. The composition of claim 9, wherein the oxide is:
a lithium-stuffed garnet oxide characterized by the formula $Li_uLa_vZr_xO_y \cdot zGa_2O_3 \cdot bAl_2O_3$, wherein u is a rational number from 4 to 10;
v is a rational number from 2 to 4;
x is a rational number from 1 to 3;

y is a rational number from 10 to 14; and
z is a rational number from 0 to 1;
b is a rational number from 0 to 1;
wherein z+b≤1; and
u, v, x, y, and z are selected so that the lithium-stuffed garnet oxide is charge neutral.

\* \* \* \* \*